United States Patent
Kurashina et al.

(10) Patent No.: US 6,259,535 B1
(45) Date of Patent: *Jul. 10, 2001

(54) PRINT IMAGE-FORMING METHOD AND DEVICE

(75) Inventors: Hiroyasu Kurashina; Takeshi Hosokawa, both of Nagano; Kenji Watanabe, Tokyo; Takanobu Kameda, Tokyo; Tomoyuki Shimmura, Tokyo; Chieko Aida, Tokyo, all of (JP)

(73) Assignees: Seiko Epson Corporation; King Jim Co., Ltd., both of Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,673

(22) Filed: Apr. 10, 1997

(30) Foreign Application Priority Data

Apr. 15, 1996 (JP) .................................................. 8-092893

(51) Int. Cl.⁷ ..................................................... G06F 15/00

(52) U.S. Cl. ........................... 358/1.8; 358/1.5; 358/1.18; 382/199; 382/213; 382/256; 382/298; 382/258

(58) Field of Search ..................................... 395/105, 108, 395/117, 101; 382/199, 213, 256, 258, 298; 358/1.5, 1.8, 1.18, 1.11, 1.12, 1.14, 1.15, 1.9

(56) References Cited

U.S. PATENT DOCUMENTS 5,434,956 * 7/1995 Son et al. ............................. 395/105
5,852,680 * 12/1998 Yoshida ................................ 382/258

FOREIGN PATENT DOCUMENTS 3173659 7/1991 (JP) ......................................... 2/485
5286175 11/1993 (JP) ......................................... 2/485

* cited by examiner

Primary Examiner—Edward Coles
Assistant Examiner—Mark Wallerson
(74) Attorney, Agent, or Firm—Hogan & Hartson LLP

(57) ABSTRACT

There are provided a print image-forming method and device. Print image data of a dot matrix is formed in which print portions are represented by positive dots and blank portions are represented by negative dots. Basic image data formed in a manner such that when the basic image data is developed into a dot matrix, a group of image pixels formed by one of a set of positive dots and a set of negative dots is capable of representing a basic image, is read from a memory device. Developed image data item representative of the basic image is formed by developing the basic image data read from the memory device into a dot matrix which is smaller in size than the dot matrix of the print image data in at least one predetermined direction of a vertical direction and a horizontal direction. At least one shifted image data is formed by shifting the developed image data item by units of dots in the predetermine direction, and the print image data is formed by causing the developed image data item and the at least one shifted image data, to be superposed, upon one another, in a manner such that the group of image pixels overrides background pixels.

26 Claims, 14 Drawing Sheets

FIG. 3A1
| S | 24 | 30 | 36 | 48 | 60 | 72 | 96 | 120 | 144 | 192 | 240 |
|---|----|----|----|----|----|----|----|-----|-----|-----|-----|
| X | 1  | 1  | 1  | 2  | 2  | 3  | 3  | 4   | 5   | 6   | 8   |
FIG. 3A2
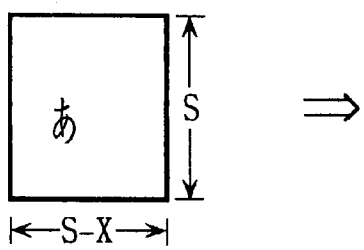
⇒
FIG. 3A3
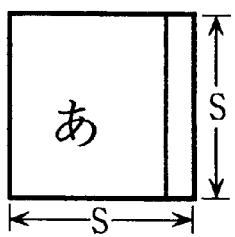
FIG. 3B1
| S | 24 | 30 | 36 | 48 | 60 | 72 | 96 | 120 | 144 | 192 | 240 |
|---|----|----|----|----|----|----|----|-----|-----|-----|-----|
| X | 1  | 1  | 1  | 1  | 1  | 2  | 2  | 3   | 3   | 4   | 5   |
FIG. 3B2
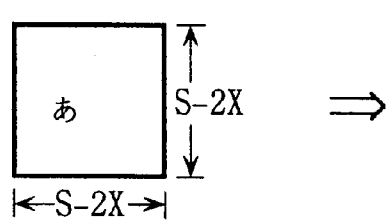
⇒
FIG. 3B3
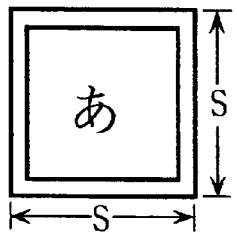

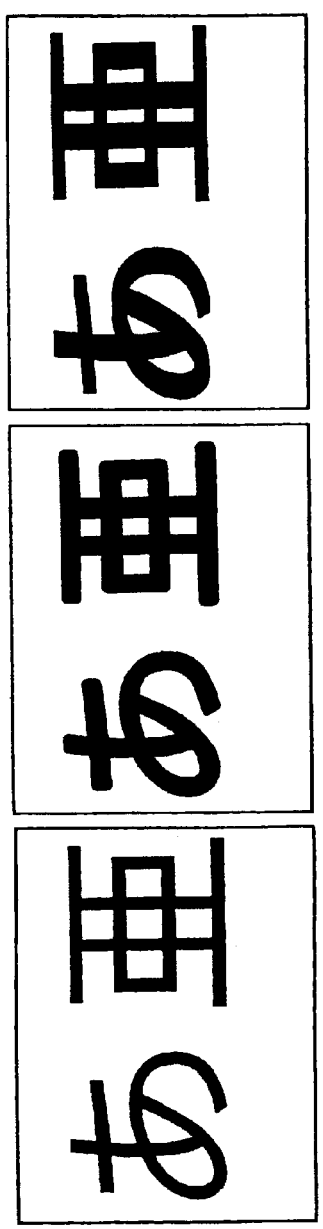

F I G. 8
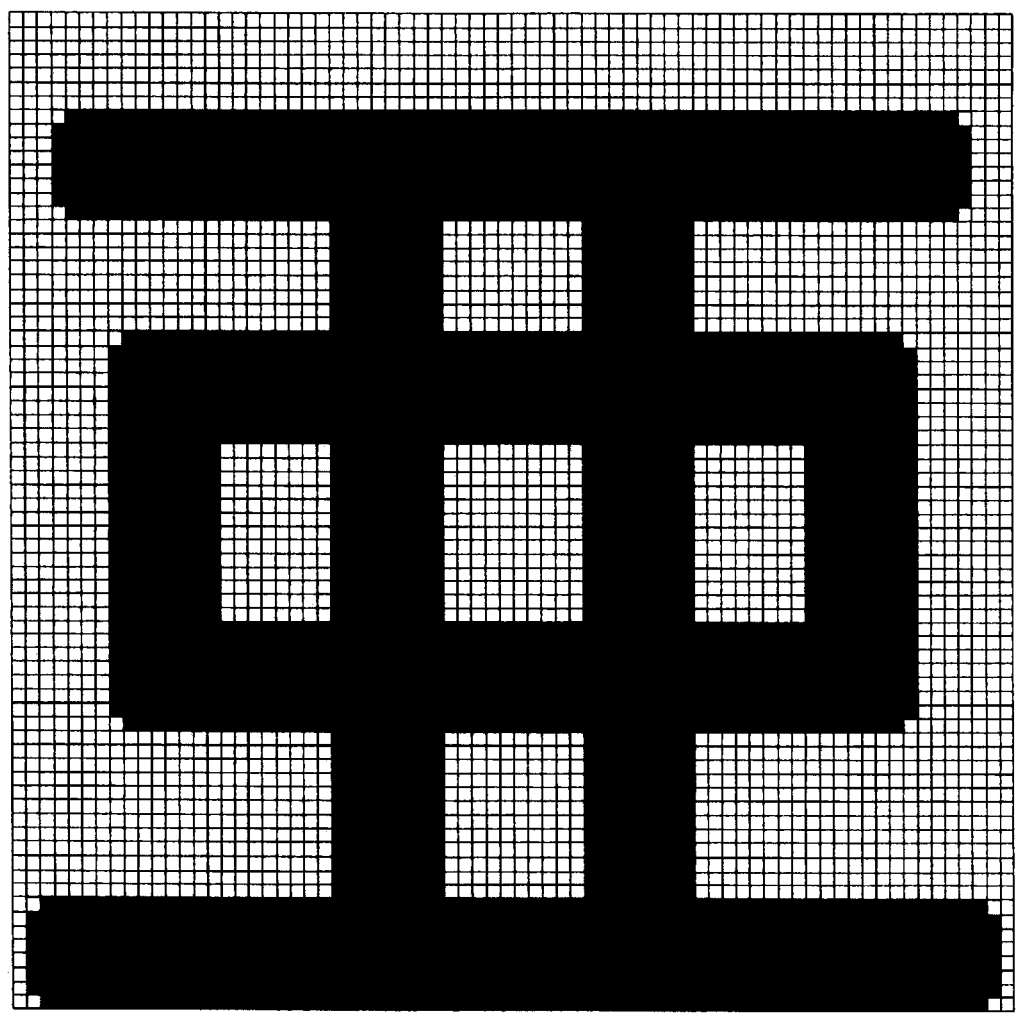

F I G. 9
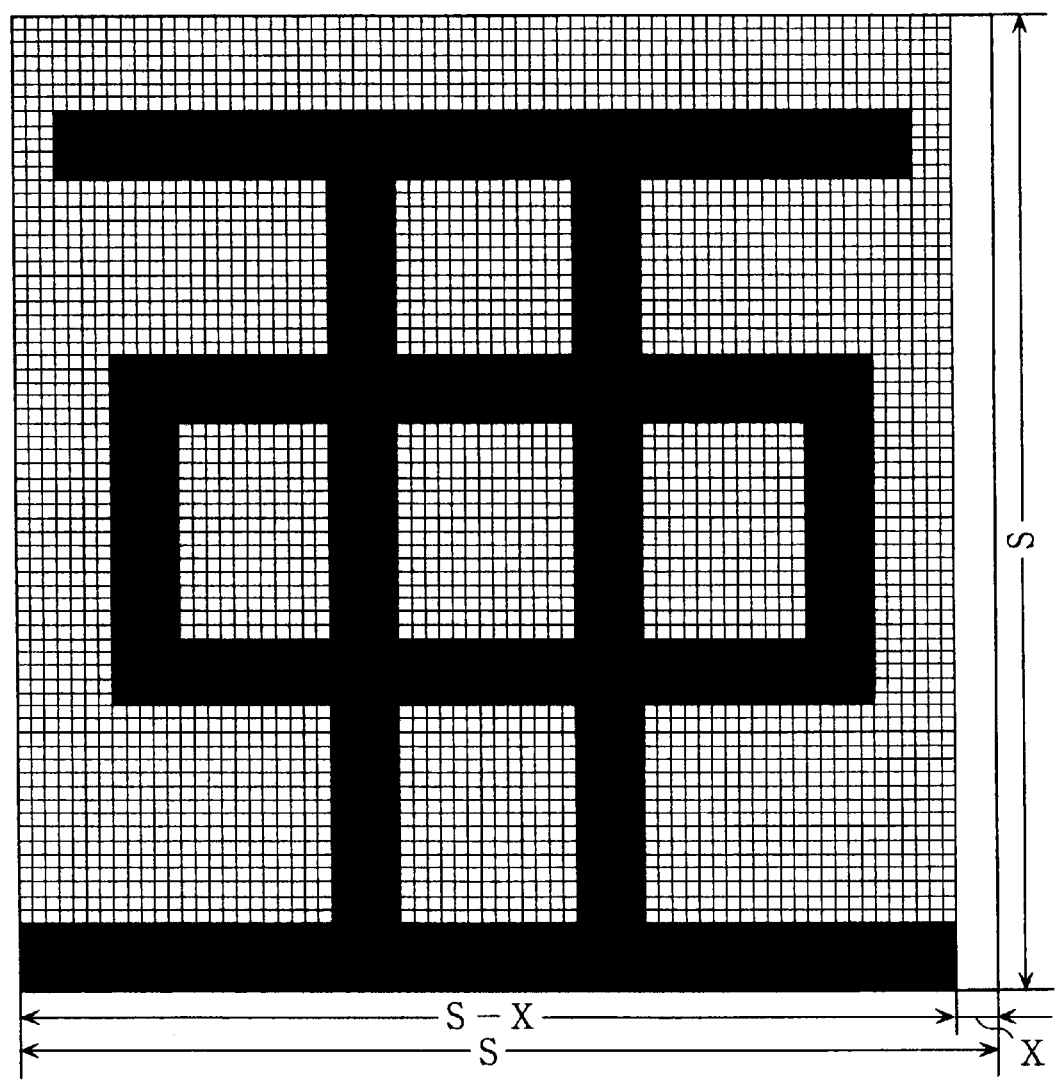

(n ≦ b)

(n > b)

FIG. 14A1
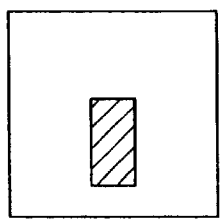
FIG. 14A2
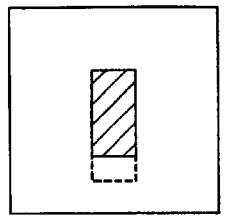
FIG. 14A4
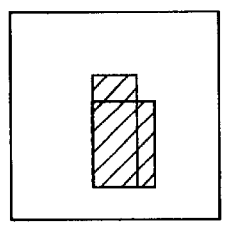
FIG. 14A3
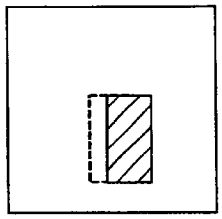
FIG. 14A5
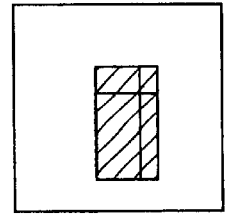
FIG. 14B1
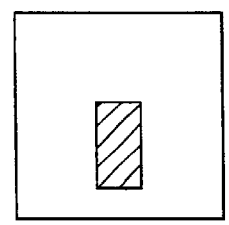
FIG. 14B2
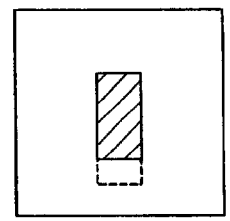
FIG. 14B3
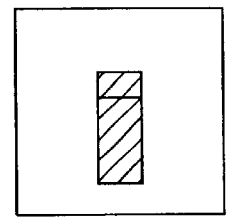
FIG. 14B4
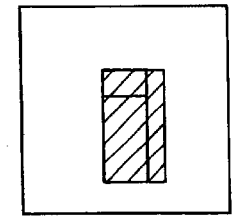

– 1 –

PRINT IMAGE-FORMING METHOD AND DEVICE

BACKGROUND OF THE INVENTION

1. Field of the Invention

This invention relates to a method of forming a print image and a device therefor.

2. Prior Art

Conventionally, an apparatus which involves printing (hereinafter referred to as "the printing apparatus"), such as a personal computer(PC), a word processor, or a label writer, carries out printing of images of letters, figures, symbols, etc. based on print image data formed or produced within itself. Letter data, figure data, and symbol data (hereinafter collectively referred to as "basic image data") defining images of letters, images of figures, and images of symbols, respectively, are stored as font data ready for use in a read only memory (ROM) or a random access memory (RAM) in advance, and read out to be developed into dot matrices of print image data, as needed.

A font is a collection of characters and the like having the same typeface and style, and can be classified according to the method of defining (or manner of expressing) an image of each member thereof into several groups: a font in which the image is defined by numerical formulas or coordinates, such as an outline font in which the shape of the image is defined by a collection of numerical formulas, a vector font in which the shape of the image is expressed by arrangement of segments, and a stroke font in which the shape of the image is expressed by a combination of lines, (hereinafter this group of fonts will be generically referred to as "the outline font", and a bit map font in which the shape of the image is expressed by a uniquely defined bit map (dot pattern). Font data of each member of a font is developed into a dot matrix according to the desired size of a print image, by the use of a font generator in the case of the former font group, while in the case of the bit map font, by expansion of the data through duplicate development of bits, etc. or reduction of the data through thinning of bits, etc. Further, the fonts can be classified according to the typeface. For example, fonts for the Japanese language are classified into Mincho typeface, Gothic typeface, Bold-Mincho typeface, Bold-Gothic typeface, Round-Mincho typeface, Round-Gothic typeface, etc. Font data of such different typefaces is normally stored in the ROM or the like, typeface by typeface, and the printing apparatus is capable of printing images of various typefaces by the use of the ROM installed thereon.

However, according to the conventional print image-forming method and device, to produce data of print images including characters of plurality of typefaces, the printing apparatus is required to be provided with a ROM or the like storing font data of the typefaces, so that if the number of typefaces increases, the cost of component parts increases due to an increase in a required capacity of memory devices such as a ROM. Further, if figures are needed which are slightly different in thickness or roundness of constituent lines from figures originally stored in the RAM or ROM, it is required to newly form the required figures by nonstandard character processing, etc. That is, to use figures slightly different from the original figures available, it not only requires the same labor of the user as needed when a figure is originally formed but also demands a larger capacity of a memory device of the printing apparatus for storing these figures individually.

To overcome these inconveniences, a print image-forming method has been proposed e.g. by Japanese Laid-Open Patent Publication (Kokai) No. 3-173659, which forms a dot pattern by shifting an original dot pattern in a specified direction by a predetermined amount and arranges the resulting dot pattern and the original dot pattern in an overlapping manner to form a letter of thickened typeface (bold-type letter).

However, this method suffers from the inconvenience that the bold-type letter thus obtained is larger in size than the original one, and out of proportion in letter size. It presents a problem particularly in a label printer which is restricted in the width and length of a printable area.

SUMMARY OF THE INVENTION

It is a first object of the invention to provide a print image-forming method which is capable of easily forming desired print image data without requiring data of a variety of sets of basic images, such as font data defining typefaces of characters, and figure data which are different in the thickness or roundness of lines forming the figures, or changing the size of modified characters from the size of original ones.

It is a second object of the invention to provide a print image-forming device which is capable of easily forming desired print image data without requiring data of a variety of sets of basic images, such as font data defining typefaces of characters, and figure data which are different in the thickness or roundness of lines forming the figures, or changing the size of modified characters from the size of original ones.

To attain the first object, according to a first aspect of the invention, there is provided a print image-forming method of forming print image data of a dot matrix in which print portions are represented by positive dots and blank portions are represented by negative dots, comprising the steps of:

reading basic image data formed in a manner such that when the basic image data is developed into the dot matrix, a group of image pixels formed by one of a set of positive dots and a set of negative dots is capable of representing a basic image, from a memory device;

forming a developed image data item representative of the basic image by developing the basic image data read from the memory device into a dot matrix which is smaller in size than the dot matrix of the print image data in at least one predetermined direction of a vertical direction and a horizontal direction;

forming at least one shifted image data item by shifting the developed image data item by units of dots in the at least one predetermine direction; and forming the print image data by causing the developed image data item and the at least one shifted image data item, to be superposed, one upon one another, in a manner such that the group of image pixels overrides background pixels.

To attain the second object, according to a second aspect of the invention, there is provided a print image-forming device, comprising:

print image-storing means for storing print image data of a dot matrix in which print portions are represented by positive dots and blank portions are represented by negative dots;

basic image-storing means for storing basic image data formed in a manner such that when the basic image data is developed into a dot matrix, a group of image pixels formed by one of a set of positive dots and a set of negative dots is capable of representing a basic image;

developed image-forming means for developing the basic image data read from the basic image-storing means into a dot matrix which is smaller in size than the dot matrix of the print image data in at least one predetermined direction of a vertical direction and a horizontal direction, to form developed image data item representative of the basic image;

shifted image data-forming means for forming at least one shifted image data by shifting the developed image data item by units of dots in the at least one predetermined direction, and print image-forming means for forming the print image by causing the developed image data item and the at least one shifted image data, to be superposed, one upon another, in a manner such that the group of image pixels overrides background pixels.

According to the print image-forming method and device of the first and second aspects of the invention, it is possible to form print image data in which a basic image is modified. That is, from the basic image data, there is formed a developed image data item which represents the basic image by a group of image pixels formed by one of a set of positive dots and a set of negative dots, i.e. a group of image pixels formed by a set of positive dots, when the print image is formed as a positive image, or a group of image pixels formed by a set of negative dots, when the print image is formed as a negative image. The basic image data is developed to the size of a dot matrix of the developed image data item, by a font generator, when the basic image data is defined as an outline font, or alternatively by expanding processing or reducing processing, when the basic image data is defined as a bit map font. Then, by forming at least one shifted image data item by shifting the developed image data item in a predetermined direction by units of dots, and superposing the at least one shifted image data item on the developed image data item, it is possible to increase the width of the group of image pixels in the predetermined direction, whereby print image data in which the basic image is modified or thickened is obtained. When the print image is a positive image, through overriding of positive dots on negative dots, print image data of a modified image in which print portions of the basic image are thickened can be formed, whereas when the print image is a negative image, print image data of a modified image in which print portions of the basic image are narrowed, i.e. portions of negative dots are increased is obtained. As a result, it is possible to convert Mincho typeface to Bold-Mincho typeface by thickening lines of the image e.g. in the horizontal direction. Therefore, in the print image-forming method and apparatus, it is possible to form print image data as desired based on basic image data without being provided with various kinds or variations of the basic image data which are different in the thickness of lines defining the style of characters and figures. Further, since the developed image data item which is made smaller in size than the basic image data in the predetermined direction (e.g. developed image data item reduced in size in the horizontal direction) and the at least one shifted image data formed by shifting the developed image data item in the predetermined direction (e.g. in the horizontal direction) by units of dots are superposed, one upon another, it is easy to make the whole size of the modified image data agree with a predetermined size of the print image data.

It is preferred that the step of forming the developed image data item includes developing the basic image data into a dot matrix which is smaller in size by n dots ($n \geq 1$) than the dot matrix of the print image data in the at least one predetermined direction, the step of forming the at least one shifted image data item including the steps of:

forming a primary shifted image data item by shifting the developed image data item by the n dots in the at least one predetermined direction, and forming m items ($0 \leq m \leq n-1$) of n-1 items of secondary shifted image data to be formed by shifting the developed image data item in the at least one predetermined direction by 1, 2, . . . , n-1 dots, respectively, in a manner such that the group of image pixels becomes continuous between the developed image data item and the primary shifted image data item, the step of forming the print image data including causing the developed image data item, the primary shifted image data, and the m items of the secondary shifted image data, to be superposed, one upon another.

Similarly, it is preferred that the developed image data item-forming means forms the developed image by developing the basic image data into a dot matrix which is smaller in size by n dots ($n \geq 1$) than the dot matrix of the print image data in the at least one predetermined direction, the shifted image data-forming means forming a primary shifted image data item by shifting the developed image data item by the n dots in the at least one predetermined direction, and forming m items ($0 \leq m \leq n-1$) of n-1 items of secondary shifted image data to be formed by shifting the developed image data item in the at least one predetermined direction by 1, 2, . . . , n-1 dots, respectively, in a manner such that the group of image pixels becomes continuous between the developed image data item and the primary shifted image data item, the print image-forming means forming the print image data by causing the developed image data item, the primary shifted image data item, and the m items of the secondary shifted image data, to be superposed, one upon another.

According to these preferred embodiments, it is possible to form print image data in which the area or group of image pixels of the developed image data item representative of the basic image is increased in width by n dots in the predetermined direction. First, if the group of image pixels of the developed image data item is continuous by more than n dots in the predetermined direction, the group of image pixels of the developed image data item and a group of image pixels of the primary shifted image data item formed by shifting the developed image data item by the n dots in the predetermined direction are immediately adjacent to each other or overlapped. Therefore, by forming only the primary shifted image data and superposing the same on the developed image data item, it is possible to form print image data in which the area or group of image pixels is increased in width by n dots. On the other hand, if the group of image pixels of the developed image data item and the group of image pixels of the primary shifted image data item are separate from each other, to make these groups of image pixels continuous with each other, m items of n-1 secondary shifted image data are only required to be formed by shifting the developed image data item by 1 to n-1 dots, respectively, and further superposed on the developed image data item and the primary shifted image data item. This makes it possible to form print image data in which the group of image pixels are increased in width by the n dots. Further, even when the groups of image pixels each extending over n dots are immediately adjacent to each other or overlapped, by interposing one or more items of the secondary shifted image data therebetween, the continuity of the image pixels is made smooth. Further, the developed image data item which is made smaller in size than the basic image data in the predetermined direction is expanded in the predetermined direction by units of dots, so that it is easier to make the whole size of the modified image data agree with a predetermined size of the print image data.

For example, the at least one predetermined direction is the horizontal direction.

According to these preferred embodiments, it is easy to form print image data in which the group or area of image pixels is increased in width in the horizontal direction by causing developed image data item decreased in size in the horizontal direction and the at least one shifted image data formed by shifting the developed image data item in the horizontal direction to be superposed, one upon another. For example, when positive dots override negative dots, it is possible to form printing image data of a modified image in which lines of a basic image in positive are thickened in the horizontal direction, whereas when negative dots override positive dots, it is possible to form printing image data of a modified image in which lines of a basic image in negative are thickened in the horizontal direction.

Alternatively, the at least one predetermined direction is the vertical direction.

According to these preferred embodiments, it is easy to form print image data in which the group or area of image pixels is increased in width in the vertical direction by causing developed image data item decreased in size in the vertical direction and shifted image data formed by shifting the developed image data item in the vertical direction to be superposed, one upon another.

It is preferred that the step of forming the developed image data item includes developing the basic image data into a dot matrix which is smaller in size than the dot matrix of the print image data in both of a vertical direction and a horizontal direction, the step of forming the at least one shifted image data item including the steps of:

forming at least one vertically-shifted image data item by shifting the developed image data item by units of dots in the vertical direction, and forming at least one horizontally-shifted image data item by shifting the developed image data item by units of dots in the horizontal direction, the step of forming the print image data including causing the developed image data item, the at least one vertically-shifted image data item, and the at least one horizontally-shifted image data item to be superposed, one upon another in a manner such that the group of image pixels overrides background pixels.

Similarly, it is preferred that the developed image data item-forming means forms the developed image data item by developing the basic image data into a dot matrix which is smaller in size than the dot matrix of the print image data in both of a vertical direction and a horizontal direction, the shifted image-forming means forming at least one vertically-shifted image data item by shifting the developed image data item by units of dots in the vertical direction, and at least one horizontally-shifted image data item by shifting the developed image data item by units of dots in the horizontal direction, the print image-forming means forming the print image data by causing the developed image data item, the at least one vertically-shifted image data item, and the at least one horizontally-shifted image data item, to be superposed, one upon another, in a manner such that the group of image pixels overrides background pixels.

According to these preferred embodiments, it is possible to form print image data in which the group or area of image pixels is increased in width in both of the vertical and horizontal directions, by causing the developed image data item and the shifted image data formed by shifting the developed image data item in both of the vertical and horizontal directions to be superposed one upon another. Further, since the developed image data item which is made smaller in size than the basic image data in both directions, the at least one vertically-shifted image data formed by shifting the developed image data item in the vertical direction, and the at least one horizontally-shifted image data formed by shifting the developed image data item in the horizontal direction are superposed, one upon another, it is easy to make the whole size of the image data after modification agree with a predetermined size of the print image data.

It is preferred that the step of forming the developed image data item includes developing the basic image data into a dot matrix which is smaller in size than the dot matrix of the print image data by n dots (n≧1) in the vertical direction and by k dots (k≧1) in the horizontal direction, the step of forming the at least one shifted image data including the steps of:

forming a primary vertically-shifted image data item by shifting the developed image data item by the n dots in the vertical direction, forming a primary horizontally-shifted image data item by shifting the developed image data item by the k dots in the horizontal direction, and forming m items (0≦m≦n−1) of n−1 items of secondary vertically-shifted image data to be formed by shifting the developed image data item by 1, 2, . . . n−1 dots, respectively, in the vertical direction, and j items (0≦j≦k−1) of k−1 items of secondary horizontally-shifted image data to be formed by shifting the developed image data item by 1, 2, . . . k−1 dots, respectively, in the horizontal direction, in a manner such that the group of image pixels is made continuous between the developed image data item and the primary vertically-shifted image data item, and between the developed image data item and the primary horizontally-shifted image data item, the step of forming the print image data including causing the developed image data item, the primary vertically-shifted image data item, the m items of the secondary vertically-shifted image data, the primary horizontally-shifted image data item, and the j items of the secondary horizontally-shifted image data, to be superposed, one upon another.

Similarly, it is preferred that the developed image-forming means forms the developed image data item by developing the basic image data into a dot matrix which is smaller in size than the dot matrix of the print image data by n dots (n≧1) in the vertical direction and by k dots (k≧1) in the horizontal direction, the shifted image-forming means forming a primary vertically-shifted image data item by shifting the developed image data item by the n dots in the vertical direction, a primary horizontally-shifted image data item by shifting the developed image data item by the k dots in the horizontal direction, m items (0≦m≦n−1) of n−1 items of secondary vertically-shifted image data to be formed by shifting the developed image data item by 1, 2, . . . n−1 dots, respectively, in the vertical direction, and j items (0≦j≦k−1) of k−1 items of secondary horizontally-shifted image data to be formed by shifting the developed image data item by 1, 2, . . . k−1 dots, respectively, in the horizontal direction, in a manner such that the group of image pixels is made continuous between the developed image data item and the primary vertically-shifted image data item, and between the developed image data item and the primary horizontally-shifted image data item, the print image-forming means forming the print image data by causing the developed image data item, the primary vertically-shifted image data item, the m items of the secondary vertically-shifted image data, the primary horizontally-shifted image data item, and the j items of the secondary horizontally-shifted image data, to be superposed, one upon another.

According to these preferred embodiments, it is possible form print image data in which the group or area of image pixels is increased in width by n dots in the vertical direction and by k dots in the horizontal direction. That is, to make the group of image pixels continuous between the developed image data item and the primary vertically-shifted image data formed by shifting the developed image data item by n dots in the vertical direction, and between the developed image data item and the primary horizontally-shifted image data formed by shifting the developed image data item by k dots in the horizontal direction, there are formed m ($0 \leq m \leq n-1$) of n-1 items of secondary vertically-shifted image data to be formed by shifting the developed image data item by 1, 2, ... n-1 dots, respectively, in the vertical direction, and j items ($0 \leq j \leq k-1$) of k-1 items of secondary horizontally-shifted image data to be formed by shifting the developed image data item by 1, 2, ... k-1 dots, respectively, in the horizontal direction, and then these data items are superposed on the developed image data item, whereby it is possible to form the print image data in which the group or area of image pixels is increased in width by the n dots in the vertical direction and by the k dots in the horizontal direction. Further, since the developed image data item is expanded by the n dots in the vertical direction in which direction the developed image data item is reduced in size by the n dots, and by k dots in the horizontal direction in which direction the same is reduced in size by k dots, it is possible to make the whole size of the modified image data agree with a predetermined size of the print image data.

It is preferred that the step of forming the developed image data item includes developing the basic image data into a dot matrix which is smaller in size than the dot matrix of the print image data in both of a vertical direction and a horizontal direction, the step of forming the at least one shifted image data item including the steps of:

forming at least one vertically-shifted image data item by shifting the developed image data item by units of dots in the vertical direction, forming at least one horizontally-shifted image data item by shifting the developed image data item by units of dots in the horizontal direction, and forming at least one diagonally-shifted image data item by shifting the developed image data item by units of dots in a diagonal direction, in a manner such that the group of image pixels is made continuous over non-overlapping portions of the group of image pixels extending in the vertical direction and non-overlapping portions of the group of image pixels extending in the horizontal direction, the non-overlapping portions being formed when the developed image data item, the at least one vertically-shifted image data item, and the at least one horizontally-shifted image data item are superposed, one upon another, the step of forming the print image data including causing the developed image data item, and the at least one vertically-shifted image data item, the at least one horizontally-shifted image data item, and the at least one diagonally-shifted image data item, to be superposed, one upon another, in a manner such that the group of image pixels overrides background pixels.

Similarly, it is preferred that the developed image-forming means forms the developed image data item by developing the basic image data into a dot matrix which is smaller in size than the dot matrix of the print image data in both of a vertical direction and a horizontal direction, the shifted image data-forming means including:

vertically-shifted image-forming means for forming at least one vertically-shifted image data item by shifting the developed image data item by units of dots in the vertical direction, horizontally-shifted image-forming means for forming at least one horizontally-shifted image data item by shifting the developed image data item by units of dots in the horizontal direction, and diagonally-shifted image-forming means for forming at least one diagonally-shifted image data item by shifting the developed image data item by units of dots in a diagonal direction, in a manner such that the group of image pixels is made continuous over non-overlapping portions of the group of image pixels extending in the vertical direction and non-overlapping portions of the group of image pixels extending in the horizontal direction, the non-overlapping portions being formed when the developed image data item, the at least one vertically-shifted image data item, and the at least one horizontally-shifted image data item, are superposed, one upon another, the print image-forming means forming the print image data by causing the developed image data item, and the at least one vertically-shifted image data item, the at least one horizontally-shifted image data item, and the at least one diagonally-shifted image data item, to be superposed, one upon another, in a manner such that the group of image pixels overrides background pixels.

When the developed image data item decreased in size in both of the vertical and horizontal directions and items of shifted image data formed by shifting the developed image data item in the both of the vertical and horizontal directions are superposed, one upon another, rectangular blank areas are formed at corners of print images after superposition of the data, each of which has sides adjacent to each other and respectively having a length corresponding to the number of dots by which the developed image data item is shifted in the vertical direction and a length corresponding to the number of dots by which the developed image item is shifted in the horizontal direction. According to these preferred embodiments, it is possible to fill or cover part or whole of the blank areas with diagonally shifted image data items, whereby continuity of non-overlapping portions of the group or area of image pixels in both of the directions can be made smooth. For example, if the diagonally-shifted image data is formed such that blank areas at the corners are completely filled, it is possible to make the corners of the print image completely rectangular. Further, if the items of diagonally-shifted image data are formed such that corners of these data items are close to or on a diagonal line of a corresponding one of the blank areas, it is possible to make the corners of the resulting image rounded. As a result, it is possible to convert Mincho typeface to Bold-Mincho typeface by thickening lines of the basic image in both of the vertical and horizontal directions, and rounding corners of the resulting lines. Therefore, according to the print image-forming method and apparatus, it is possible to form print image data as desired without being provided with various kinds of basic image data which are different only in the thickness and roundness of corners of lines forming the image defined by the basic image data.

It is preferred that the step of forming the developed image data item includes developing the basic image data into a dot matrix which is smaller in size than the dot matrix of the print image data by n dots ($n \geq 1$) in the vertical direction and by k dots ($k \geq 1$) in the horizontal direction, the step of forming the at least one shifted image data item including the steps of:

forming a primary vertically-shifted image data item by shifting the developed image data item by the n dots in the vertical direction, forming a primary horizontally-shifted image data item by shifting the developed image data item by the k dots in the horizontal direction, and forming m items ($0 \leq m \leq n-1$) of n−1 items of secondary vertically-shifted image data to be formed by shifting the developed image data item by 1, 2, ... n−1 dots, respectively, in the vertical direction, and j items ($0 \leq j \leq k-1$) of k−1 items of secondary horizontally-shifted image data to be formed by shifting the developed image data item by 1, 2, ... k−1 dots, respectively, in the horizontal direction, in a manner such that the group of image pixels is made continuous between the developed image data item and the primary vertically-shifted image data item, and between the developed image data item and the primary horizontally-shifted image data item, n−1) of n−1 items of secondary vertically-shifted image data to be formed by shifting the developed image data item by 1, 2, ... n−1 dots, respectively, in the vertical direction, and j items ($0 \leq j \leq k-1$) of k−1 items of secondary horizontally-shifted image data to be formed by shifting the developed image data item by 1, 2, ... k−1 dots, respectively, in the horizontal direction, in a manner such that the group of image pixels is made continuous between the developed image data item and the primary vertically-shifted image data item, and between the developed image data item and the primary horizontally-shifted image data item, the diagonally-shifted image data-forming means forming g items ($0 \leq g \leq k$) of k items of diagonally-shifted image data corresponding to respective horizontal shifts of i dots ($k \geq i \geq 1$) by shifting the developed image data item by respective combinations of the i dots in the horizontal direction and any of a, a+1, a+2, ... and n dots (a is equal to an integer which is the largest of integers smaller than $n \times (1-i/k)$) in the vertical direction, the print image-forming means forming the print image data by causing the developed image data item, the primary vertically-shifted image data item, the m items of the secondary vertically-shifted image data, the primary horizontally-shifted image data item, the j items of the secondary horizontally-shifted image data, and the g items of the diagonally-shifted image data, to be superposed, one upon another.

According to these preferred embodiments, it is possible to form print image data in which the group or area of image pixels is increased in width by n dots in the vertical direction and by k dots in the horizontal direction. Further, it possible to make the whole size of a modified the step of forming the at least one diagonally-shifted image data item including forming g items ($0 \leq g \leq k$) of k items of diagonally-shifted image data corresponding to respective horizontal shifts of i dots ($k \geq i \geq 1$) by shifting the developed image data item by respective combinations of the i dots in the horizontal direction and any of a, a+1, a+2, ... and n dots (a is equal to an integer which is the largest of integers smaller than $n \times (1 \times i/k)$) in the vertical direction, the step of forming the print image data including causing the developed image data item, the primary vertically-shifted image data item, the m items of the secondary vertically-shifted image data, the primary horizontally-shifted image data item, the j items of the secondary horizontally-shifted image data, and the g items of the diagonally-shifted image data, to be superposed, one upon another.

Similarly, it is preferred that the developed image-forming device forms the developed image data item by developing the basic image data into a dot matrix which is smaller in size than the dot matrix of the print image data by n dots ($n \geq 1$) in the vertical direction and by k dots ($k \geq 1$) in the horizontal direction, the vertically-shifted image-forming means forming a primary vertically-shifted image data item by shifting the developed image data item by the n dots in the vertical direction, the horizontally-shifted image-forming means forming a primary horizontally-shifted image data item by shifting the developed image data item by the k dots in the horizontal direction, the shifted image-forming means including secondary shifted image-forming means for forming m items ($0 \leq m \leq$ image agree with a predetermine size of the print image data. In addition, by further superposing g items of diagonally-shifted image data corresponding to respective horizontal shifts of i dots, which are obtained by shifting the developed image data item by respective combinations of the i dots in the horizontal direction and any of a to n dots in the vertical direction, it is possible to fill or cover rectangular blank areas formed at corners of the image formed by superposing the developed image data item, the primary and secondary vertically-shifted image data items, and the primary and second horizontally-shifted image data items, one upon another, or arrange corners of images of the diagonally-shifted image data items in a manner lined close to a diagonal line of the rectangular blank areas. Therefore, it is possible to make the corners rectangular or rounded. For example, if n=6 and k=5 hold, the above blank area is a rectangle of 6×5 dots. For a horizontal shift i=1 dot, $6 \times (1-i/5) = 6 \times (1-1/5) = 4.8$ results. Accordingly, a=4 is obtained, so that the vertical shift is set to any of 4 to 6 dots. Similarly, for horizontal shits i=2, 3, 4, and 5, corresponding vertical shifts are set to any of 3 to 6, any of 2 to 6, any of 1 to 6, and any of 0 to 6. This makes it possible to make the corners slightly concave with respect to the diagonal line of the rectangle of 6×5 dots. Alternatively, it is possible to make the same completely rectangular by setting all the vertical shifts to 6.

It is preferred that the step of forming the developed image data item includes developing the basic image data into a dot matrix which is smaller in size than the dot matrix of the print image data by 2n dots ($n \geq 1$) in the vertical direction and by 2k dots ($k \geq 1$) in the horizontal direction, the step of forming the at least one shifted image data item including the steps of:

forming a primary upward-shifted image data item by shifting the developed image data item by the n dots in an upward direction, a primary downward-shifted image data item by shifting the developed image data item by the n dots in a downward direction, a primary rightward-shifted image data item by shifting the developed image data item by the n dots in a rightward direction, and a primary-leftward-shifted image data item by shifting the developed image data item by the n dots in a leftward direction, and forming Mu items ($0 \leq Mu \leq n-1$) of n-1 items of secondary upward-shifted image data to be formed by shifting the developed image data item by 1, 2, ... n-1 dots, in the upward direction, Md items ($0 \leq Md \leq n-1$) of n-1 items of secondary downward-shifted image data to be formed by shifting the developed image data item by 1, 2, ... n-1 dots, respectively, in the downward direction, Jr items ($0 \leq Jr \leq k-1$) of k-1 items of secondary rightward-shifted image data to be formed by shifting the developed image data item by 1, 2, ... k-1 dots, respectively, in the rightward direction, and Jl ($0 \leq Jl \leq k-1$) of k-1 items of secondary leftward-shifted image data to be formed by shifting the developed image data item by 1, 2, ... k-1 dots in the leftward direction, in a manner such that the group of image pixels is made continuous between the developed image data item and the primary upward-shifted image data, between the developed image data item and the primary downward-shifted image data item, between the developed image data item and the primary rightward-shifted image data item, and between the developed image data item and the primary-leftward-shifted image data item, the step of forming the at least one diagonally-shifted image data item including forming Gru items ($0 \leq Gru \leq k$) of k items of rightward/upward-shifted image data corresponding to respective rightward shifts of Ir dots ($k \geq Ir \geq 1$) by shifting the developed image data item by respective combinations of the Ir ($k \geq Ir \geq 1$) dots in the rightward direction and any of Ar, Ar+1, Ar+2, ... and n dots (Ar is equal to an integer which is the largest of integers smaller than $n \times (1-Ir/k)$) in the upward direction, Grd items ($0 \leq Grd \leq k$) of k items of rightward/downward-shifted image data corresponding to the respective rightward shifts of Ir dots ($k \geq Ir \geq 1$) by shifting the developed image data item by respective combinations of the Ir ($k \geq Ir \geq 1$) dots in the rightward direction and any of the Ar, Ar+1, Ar+2, ... and n dots in the downward direction, Glu items ($0 \leq Glu \leq k$) of k items of leftward/upward-shifted image data corresponding to respective leftward shifts of Il dots ($k \geq Il \geq 1$) by shifting the developed image data item by respective combinations of the Il ($Il \geq 1$) dots in the leftward direction and any of the Al, Al+1, Al+2, ... and n dots in the upward direction, and Gld items ($0 \leq Gld \leq k$) of k items of leftward/downward-shifted image data corresponding to the respective leftward shifts of Il dots ($k \geq Il \geq 1$) by shifting the developed image data item by respective combinations of the Il ($Il \geq 1$) dots in the leftward direction and any of the Al, Al+1, Al+2, ... and n dots in the downward direction, the step of forming the print image data including causing the developed image data item, the primary upward-shifted image data item, the Mu items of the secondary upward-shifted image data, the primary downward-shifted image data item, the Md items of the secondary downward-shifted image data, the primary rightward-shifted image data item, the Jr items of the secondary rightward-shifted image data, the primary-leftward-shifted image data item, the Jl items of the secondary leftward-shifted image data, the Gru items of the rightward/upward-shifted image data, the Grd items of the rightward/downward-shifted image data, the Glu items of the leftward/upward-shifted image data, and the Gld items of the leftward/downward-shifted image data, to be superposed, one upon another.

Similarly, it is preferred that the developed image-forming means forms the developed image data item by developing the basic image data into a dot matrix which is smaller in size than the dot matrix of the print image data by 2n dots ($n \geq 1$) in the vertical direction and by 2k dots ($k \geq 1$) in the horizontal direction, the vertically-shifted image-forming means forming a primary upward-shifted image data item by shifting the developed image data item by the n dots in an upward direction, and a primary downward-shifted image data item by shifting the developed image data item by the n dots in a downward direction, the horizontally-shifted image-forming means forming a primary rightward-shifted image data item by shifting the developed image data item by the n dots in a rightward direction, and a primary-leftward-shifted image data item by shifting the developed image data item by the n dots in a leftward direction, the shifted image-forming means including second shifted image-forming means for forming Mu items ($0 \leq Mu \leq n-1$) of n-1 items of secondary upward-shifted image data to be formed by shifting the developed image data item by 1, 2, ... n-1 dots, respectively, in the upward direction, Md items ($0 \leq Md \leq n-1$) of n-1 items of secondary downward-shifted image data to be formed by shifting the developed image data item by 1, 2, ... n-1 dots, respectively, in the downward direction, Jr items ($0 \leq Jr \leq k-1$) of k-1 items of secondary rightward-shifted image data to be formed by shifting the developed image data item by 1, 2, ... k-1 dots, respectively, in the rightward direction, and Jl items ($0 \leq Jl \leq k-1$) of k-1 items of secondary leftward-shifted image data to be formed by shifting the developed image data item by 1, 2, ... k-1 dots in the leftward direction, in a manner such that the group of image pixels is made continuous between the developed image data item and the primary upward-shifted image data, between the developed image data item and the primary downward-shifted image data item, between the developed image data item and the primary rightward-shifted image data item, and between the developed image data item and the primary-leftward-shifted image data item, the diagonally-shifted image-forming means forming Gru items ($0 \leq Gru \leq k$) of k items of rightward/upward-shifted image data corresponding to respective rightward shifts of Ir dots ($k \geq Ir \geq 1$) by shifting the developed image data item by respective combinations of the Ir ($k \geq Ir \geq 1$) dots in the rightward direction and any of Ar, Ar+1, Ar+2, ... and n dots (Ar is equal to an integer which is the largest of integers smaller than $n \times (1-Ir/k)$) in the upward direction, Grd items ($0 \leq Grd \leq k$) of k items of rightward/downward-shifted image data corresponding to the respective leftward shifts of Il dots ($k \geq Il \geq 1$) by shifting the developed image data item by respective combinations of the Ir ($k \geq Ir \geq 1$) dots in the rightward direction and any of the Ar, Ar+1, Ar+2, ... and n dots in the downward direction, Glu items ($0 \leq Glu \leq k$) of k items of leftward/upward-shifted image data corresponding to respective rightward shifts of Ir dots ($k \geq Ir \geq 1$) by shifting the developed image data item by respective combinations of the Il ($Il \geq 1$) dots in the leftward direction and any of the Al, Al+1, Al+2, ... and n dots, in the upward direction, and Gld items ($0 \leq Gld \leq k$) of k items of leftward/downward-shifted image data corresponding to respective leftward shifts of Il dots (Il≧1) by shifting the developed image data item by the respective combinations of the Il dots (k≧Il≧1) in the leftward direction and any of the Al, Al+1, Al+2, . . . and n dots in the downward direction, the print image-forming means forming the print image data by causing the developed image data item, the primary upward-shifted image data item, the Mu items of the secondary upward-shifted image data, the primary downward-shifted image data item, the Md items of the secondary downward-shifted image data, the primary rightward-shifted image data item, the Jr items of the secondary rightward-shifted image data, the primary-leftward-shifted image data item, the Jl items of the secondary leftward-shifted image data, the Gru items of the rightward/upward-shifted image data, the Grd items of the rightward/downward-shifted image data, the Glu items of the leftward/upward-shifted image data, and the Gld items of the leftward/downward-shifted image data, to be superposed, one upon another.

According to these preferred embodiments, by applying the corner treatment base on the diagonally-shifted image data to upper right, upper left, lower right, and lower left corners of images, it is possible to make all these corners rectangular or rounded, as described above.

It is preferred that the step of forming the developed image data item includes developing the basic image data into a dot matrix which is smaller in size than the dot matrix of the print image data in both of a vertical direction and a horizontal direction, the step of forming the at least one shifted image data item including the steps of:
   forming a first shifted image data item by shifting the developed image data item by units of dots in one of the vertical direction and the horizontal direction,
   forming a temporary developed image data item by causing the developed image data item and the first shifted image data, to be superposed, one upon another, in a manner such that the group of the image pixels overrides background pixels, and
   forming a second shifted image data item by shifting the temporary developed image data item by units of dots in the other of the vertical direction and the horizontal direction, and
   the step of forming the print image data including causing the temporary shifted image data and the second shifted image data, to be superposed, one upon another, in a manner such that the group of image pixels overrides the background pixels.

Similarly, it is preferred that the developed image-forming means forms the developed image data item by developing the basic image data into a dot matrix which is smaller in size than the dot matrix of the print image data in both of a vertical direction and a horizontal direction,
   the shifted image-forming means including:
   first shifted image data-forming means for forming a first shifted image data item by shifting the developed image data item by units of dots in one of the vertical direction and the horizontal direction,
   temporary developed image-forming means for forming a temporary developed image data item by causing the developed image data item and the first shifted image data, to be superposed, one upon another, in a manner such that the group of the image pixels overrides background pixels, and
   second shifted image-forming means for forming a second shifted image data by shifting the temporary developed image data item by units of dots in the other of the vertical direction and the horizontal direction,
   the print image-forming means forming the print image data by causing the temporary shifted image data item and the second shifted image data item to be superposed, one upon another, in a manner such that the group of image pixels overrides the background pixels.

According to these preferred embodiments, it is possible to form print image data in which the group or area of image pixels is increased in width in both of the vertical and horizontal directions. Further, since the developed image data item which is reduced in size in both of the directions is shifted and items of shifted image data formed by shifting the developed image data item in both of the vertical and horizontal directions are superposed, one upon another, it is easy to make the whole size of the modified image agree with a predetermined size of the print image data. Further, in these preferred embodiments, after the temporary developed image data item is formed by causing the developed image data item and the first shifted image data item formed by shifting the developed image data item in one of the vertical and horizontal directions, to be superposed, one upon another, the temporary developed image data item is shifted in the other direction, and then superposed. Therefore, the resulting print image data presents no blank areas in corners of the print image, to make the corners completely rectangular.

It is preferred that the step of forming the developed image data item includes developing the basic image data into a dot matrix which is smaller in size than the dot matrix of the print image data by n dots (n≧1) in the vertical direction and by k dots (k≧1) in the horizontal direction, the step of forming the first shifted image data item including the steps of:
   forming one of a primary vertically-shifted image data item to be formed by shifting the developed image data item by the n dots in the vertical direction and a primary horizontally-shifted image data item to be formed by shifting the developed image data item by the k dots in the horizontal direction, as the first shifted image data item,
   forming m items (0≦m≦n−1) of n−1 items of secondary vertically-shifted image data to be formed by shifting the developed image data item by 1, 2, . . . n−1 dots, respectively, in the vertical direction, in a manner such that the group of image pixels is made continuous between the developed image data item and the primary vertically-shifted image data item, when the primary vertically-shifted image data item is formed as the first shifted image data item, and
   forming j items (0≦j≦k−1) of k−1 items of secondary horizontally-shifted image data to be formed by shifting the developed image data item by 1, 2, . . . k−1 dots, respectively, in the horizontal direction, in a manner such that the group of image pixels is made continuous between the developed image data item and the primary horizontally-shifted image data item, when the primary horizontally-shifted image data item is formed as the first shifted image data item, the step of forming the temporary developed image data item including the steps of:
   causing the developed image data item, the primary vertically-shifted image data item and the m items of the secondary vertically-shifted image data, to be superposed, one upon another, when the first shifted image data is the primary vertically-shifted image data item, and
   causing the developed image data item, the primary horizontally-shifted image data item, and the j items of the secondary horizontally-shifted image data, to be superposed, one upon another, when the first shifted image data item is the primary horizontally-shifted image data item, the step of forming the second shifted image data item including the steps of:

forming a primary horizontally-shifted image data item by shifting the temporary developed image data item by k dots in the horizontal direction as the second shifted image data, and j items ($0 \leq j \leq k-1$) of k-1 items of secondary horizontally-shifted image data to be formed by shifting the developed image data item by 1, 2, ... k-1 dots, respectively, in the horizontal direction, in a manner such that the group of image pixels is made continuous between the temporary developed image data item and the primary horizontally-shifted image data item, when the primary vertically-shifted image data is formed as the first shifted image data, and forming a primary vertically-shifted image data item by shifting the temporary developed image data item by the n dots in the vertical direction as the second shifted image data item, and m items ($0 \leq m \leq n-1$) of n-1 items of secondary vertically-shifted image data to be formed by shifting the developed image data item by 1, 2, ... n-1 dots, respectively, in the vertical direction, in a manner such that the group of image pixels is made continuous between the temporary developed image data item and the primary vertically-shifted image data item, when the primary horizontally-shifted image data is formed as the first shifted image data, the step of forming the print image data including:

causing the temporary developed image data item, the primary horizontally-shifted image data item, and the j items of the secondary horizontally-shifted image data, to be superposed, one upon another, when the primary horizontally-shifted image data is formed as the second shifted image data, and causing the temporary developed image data item, the primary vertically-shifted image data item, and the m items of the secondary vertically-shifted image data, to be superposed, one upon another, when the primary vertically-shifted image data item is formed as the second shifted image data item.

Similarly, it is preferred that the developed image-forming means forms the developed image data item by developing the basic image data into a dot matrix which is smaller in size than the dot matrix of the print image data by n dots ($n \geq 1$) in the vertical direction and by k dots ($k \geq 1$) in the horizontal direction, the first shifted image-forming means forming one of a primary vertically-shifted image data item to be formed by shifting the developed image data item by the n dots in the vertical direction and a primary horizontally-shifted image data item to be formed by shifting the developed image data item by the k dots in the horizontal direction, as the first shifted image data item, forming m items ($0 \leq m \leq n-1$) of n-1 items of secondary vertically-shifted image data to be formed by shifting the developed image data item by 1, 2, . . . n-1 dots, respectively, in the vertical direction, in a manner such that the group of image pixels is made continuous between the developed image data item and the primary vertically-shifted image data item, when the primary vertically-shifted image data item is formed as the first shifted image data item, and forming j items ($0 \leq j \leq k-1$) of k-1 items of secondary horizontally-shifted image data to be formed by shifting the developed image data item by 1, 2, . . . k-1 dots, respectively, in the horizontal direction, in a manner such that the group of image pixels is made continuous between the developed image data item and the primary horizontally-shifted image data item, when the primary horizontally-shifted image data item is formed as the first shifted image data item, the temporary developed image-forming means forming the temporary developed image data item by causing the developed image data item, the primary vertically-shifted image data item, and the m items of the secondary vertically-shifted image data, to be superposed, one upon another, when the first shifted image data item is the primary vertically-shifted image data item, and causing the developed image data item, the primary horizontally-shifted image data item, and the j items of the secondary horizontally-shifted image data, to be superposed, one upon another, when the first shifted image data is the primary horizontally-shifted image data, the second shifted image-forming means forming a primary horizontally-shifted image data item by shifting the temporary developed image data item by k dots in the horizontal direction as the second shifted image data, and j items ($0 \leq j \leq k-1$) of k-1 items of secondary horizontally-shifted image data to be formed by shifting the developed image data item by 1, 2, . . . k-1 dots, respectively, in the horizontal direction, in a manner such that the group of image pixels is made continuous between the temporary developed image data item and the primary horizontally-shifted image data item, when the primary vertically-shifted image data item is formed as the first shifted image data item, and forming a primary vertically-shifted image data item by shifting the temporary developed image data item by the n dots in the vertical direction, as the second shifted image data item, and m items ($0 \leq m \leq n-1$) of n-1 items of secondary vertically-shifted image data to be formed by shifting the developed image data item by 1, 2, . . . n-1 dots, respectively, in the vertical direction, in a manner such that the group of image pixels is made continuous between the temporary developed image data item and the primary vertically-shifted image data item, when the primary horizontally-shifted image data is formed as the first shifted image data item, the print image-forming means forming the print image data by causing the temporary developed image data item, the primary horizontally-shifted image data item, and the j items of the secondary horizontally-shifted image data, to be superposed, one upon another, when the primary horizontally-shifted image data item is formed as the second shifted image data item, and causing the primary developed image data item, the primary vertically-shifted image data item, and the m items of the secondary vertically-shifted image data, to be superposed, one upon another, when the primary vertically-shifted image data item is formed as the second shifted image data item.

According to these preferred embodiments, it is possible to form print image data in which the group or area of image pixels is increased in width by n dots in the vertical direction and by k dots in the horizontal direction, and make the whole size of modified image agree with a predetermined size of the print image data. Further, it is possible to make the corners of the resulting print image completely rectangular without forming any blank areas in corners of the print image.

The above and other objects, features, and advantages of the invention will become more apparent from the following

BRIEF DESCRIPTION OF THE DRAWINGS

FIG. 3A1 shows a table defining values of the size of each character and the size of a corresponding decrement, which are employed in a thickening modification;

FIG. 3A2 is a diagram illustrating the size of developed image data item formed during the thickening modification;

FIG. 3A3 is a diagram illustrating the size of print image data obtained by the thickening modification;

FIG. 3B1 shows a table defining values of the size of each character and the size of a corresponding decrement, which are employed in a thickening-rounding modification;

FIG. 3B2 is a diagram illustrating the size of developed image data item formed during the thickening-rounding modification;

FIG. 3B3 is a diagram illustrating the size of print image data obtained by the thickening-rounding modification;

FIGS. 4A1 to 4A3 are diagrams showing examples of basic images (Mincho typeface) of a Japanese kana character "あ" and a kanji character "亜", images obtained by the thickening-rounding modification of the basic images (Round-Mincho typeface), and images obtained by the thickening modification of the same (Bold-Mincho typeface);

FIGS. 4B1 to 4B3 are diagrams showing examples of basic images (Gothic typeface) of the same Japanese kana character and the same kanji character, images obtained by the thickening-rounding modification of the basic images (Round-Gothic typeface), and images obtained by the thickening modification of the same (Bold-Gothic typeface);

FIG. 8 shows print image data formed by execution of diagonally-superposing processing on the FIG. 7 image data;

FIG. 9 is a diagram showing developed image data item of the kanji character "亜" before execution of the thickening modification;

FIGS. 14A1 to 14A5 are diagrams which are useful in summarizing a manner of forming rectangular corners when thickening modifications of image data are carried out both in vertical and horizontal directions, as shown in FIG. 2; and FIGS. 14B1 to 14B4 are diagrams which are useful in explaining another method of forming rectangular corners when thickening modification of image data is carried out both in vertical and horizontal directions

DETAILED DESCRIPTION

The invention will now be described in detail with reference to the drawings showing embodiments thereof.

Figure 1:
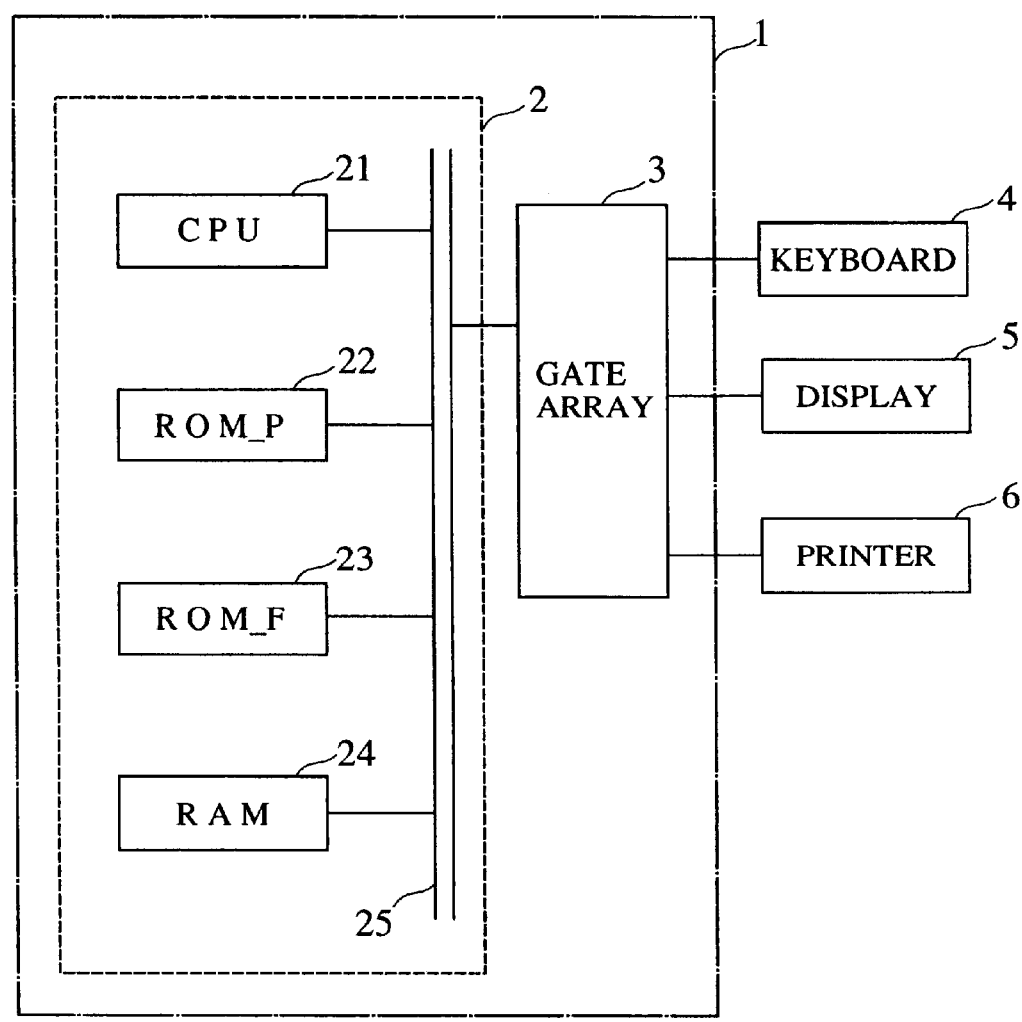
FIG. 1 is a block diagram schematically showing the whole arrangement of a printing apparatus incorporating a print image-forming device according to an embodiment of the invention.

Referring first to FIG. 1, there is shown the whole arrangement of a printing apparatus 1 incorporating a print image-forming device according to an embodiment of the invention. The printing apparatus 1 is comprised of a control block 2 and a gate array 3. The gate array 3 is connected to peripheral devices of the printing apparatus 1, i.e. a keyboard 4, a display unit 5, and a printer 6. The gate array 3 receives input data of letters, symbols, etc. entered via the keyboard 4 to supply the same into a bus 25 of the control block 2, and controls the operation of the display unit 5 according to commands delivered from the control unit 2. Further, the gate array 3 causes the printer 6 to carry out printing based print image data supplied from the control block 2 via the bus 25.

The control block 2 is embodied as a logic circuit comprised of a central processing unit (CPU) 21, a read only memory (ROM)_P 22, a read only memory (ROM)_F 23, a random access memory (RAM) 24, all of which are connected to each other via the bus 25. The ROM_F 23 stores font data of Mincho typeface and Gothic typeface each defined as an outline font, and the ROM_P 22 stores control programs executed by the printing apparatus 1, including a program for print image-forming processing, referred to hereinafter.

Similarly to word processors of a general type, the printing apparatus 1 has an optional feature of permitting changes in the settings of a character size and a typeface for printing by the printer 6. That is, the user can designate the character size and select any of Mincho typeface and Gothic typeface as well as Round-Mincho typeface, Round-Gothic typeface, Bold-Mincho typeface, and Bold-Gothic typeface, by entries via the keyboard 4 made in respective predetermined manners, e.g. by entry from function keys.

In response to designation of the character size effected via the keyboard 4, the CPU 21 selects the number of pixels (dots) suitable for clear print of an image of each character having the designated character size, from predetermined dot numbers of 24, 30, . . . 240 representative of respective character sizes (see FIG. 3), and stores the selected dot number in a character size-storing area, not shown, within the RAM 24 (hereafter, the character sizes are designated by respective dot numbers). Further, in response to designation of a typeface via the keyboard 4, the CPU 21 sets one of typeface-setting flags stored in a flag area, not shown, within the RAM 24, which is indicative of the designated typeface, i.e. one of a Mincho typeface flag, a Bold-Mincho typeface flag, a Round-Mincho typeface flag, a Round-Gothic typeface flag, a Bold-Mincho typeface flag, and a Bold-Gothic typeface flag, neither of which is shown.

In this state, when a letter, symbol or the like for printing is entered via the keyboard 4, the CPU 21 reads font data corresponding to input data of the letter, symbol or the like from the ROM_F 23 according to the control program read from the ROM_P 22, and executes the print image-forming processing in response to edits carried out by the user on displayed data on the display unit 5 to form print image data, using a working area in the RAM 24. Then, the CPU 21 delivers the print image data via the bus 25 to the gate array 3 to cause the printer 6 to carry out printing as desired.

In the printing apparatus 1, the print image-forming method and device of the invention is essentially embodied or put into practice by the control block 2, and operations characteristic thereof will be described with reference to FIGS. 2 to 14B4.

Figure 2:
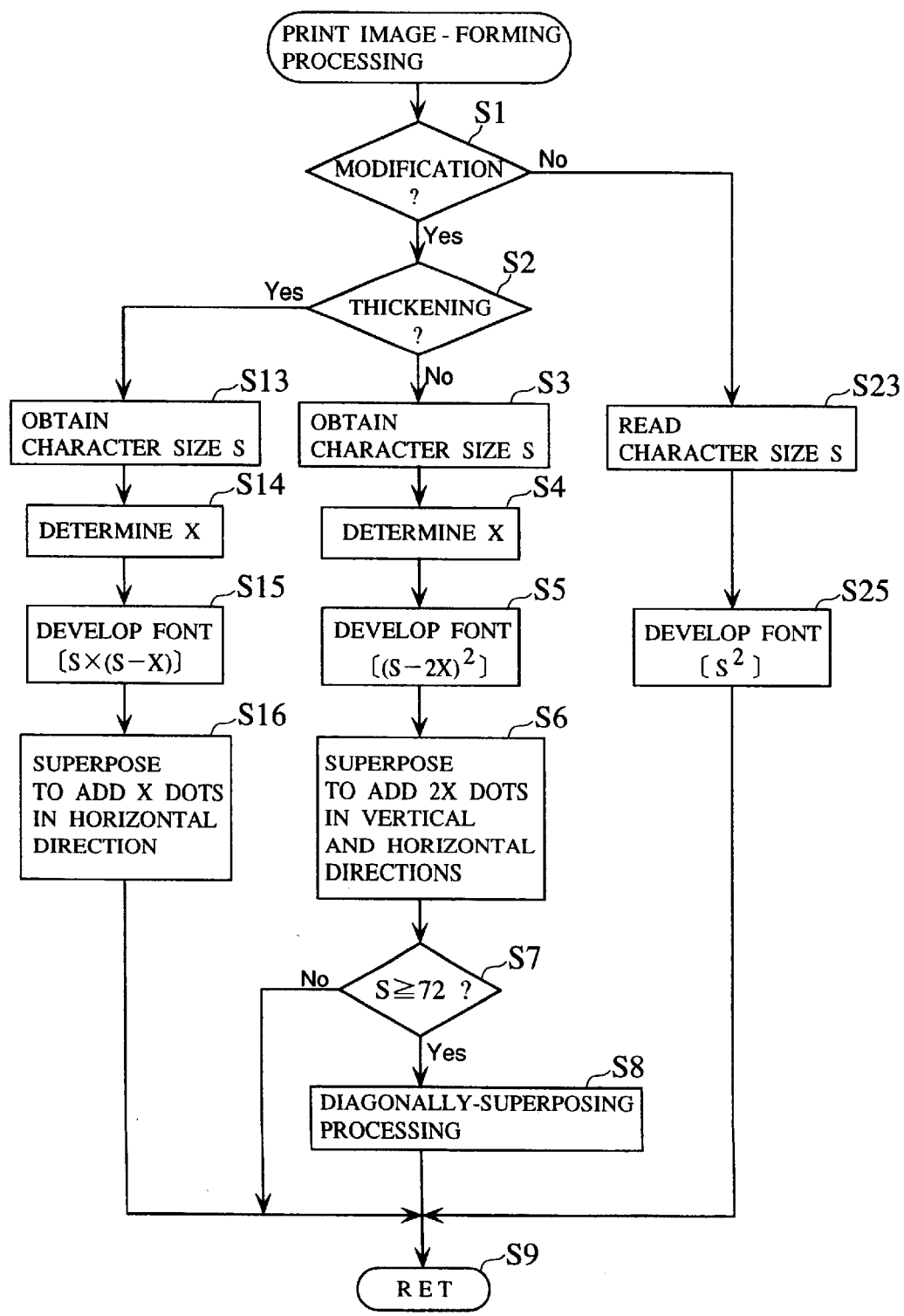
FIG. 2 is a flowchart of print image-forming processing executed by the print image-forming device.

Referring to FIG. 2, when the print image-forming processing is started, first, it is determined at a step S1 whether or not a print image to be formed requires a modification. That is, since the ROM_F 23 stores only font data of Mincho typeface and Gothic typeface, if any of the above-mentioned typeface-setting flags other than the Mincho typeface flag and the Gothic typeface flag is set, it is judged that the print image requires a modification, i.e. the answer to the question to the step S1 is affirmative (Yes). If the print image requires a modification, it is then determined at a step S2 whether or not the modification required is a thickening modification. For example, when a print image of Bold-Mincho typeface is to be formed, a basic image of the character of Mincho typeface has to be thickened, whereas when a print image of Bold-Gothic typeface is to be formed, a basic image of Gothic typeface has to be thickened (see FIG. 4). Therefore, if the typeface-setting flag for one of these typefaces which require thickening is set, it is judged that the thickening modification is designated, that is, the answer to the question of the step S2 is affirmative (Yes). On the other hand, if a modification is required (Yes to S1), but the modification required is not the thickening modification (No to S2), it is judged that a thickening-and-rounding modification is designated. For example, when a print image of Round-Mincho typeface is to be formed, a basic image of Mincho typeface has to be thickened and rounded, whereas when a print image of Round-Gothic typeface is to be formed, a basic image of Gothic typeface has to be thickened and rounded. Therefore, if a typeface-setting flag for one of the typefaces which require thickening and rounding is set, it is judged that the thickening-and-rounding modification is designated.

Then, if no modification is designated, i.e. if either Mincho typeface or Gothic typeface is designated, a step S23 for character size (S)-reading processing et seq. are carried out, whereas if the thickening modification is designated, i.e. either Bold-Mincho typeface or Bold-Gothic typeface is designated, a step S13 for the character size (S)-reading processing et seq. are carried out. Further, if the thickening-and-rounding modification is designated, i.e. either the Round-Mincho typeface or the Round-Gothic typeface is designated, a step S3 for the character size (S)-reading processing at et seq. are carried out. The character size S is read from the aforementioned character size-storing area, and in forming a modified print image, the character size S is utilized in determining the size of developed image data item in executing font development thereafter.

Figure 5:
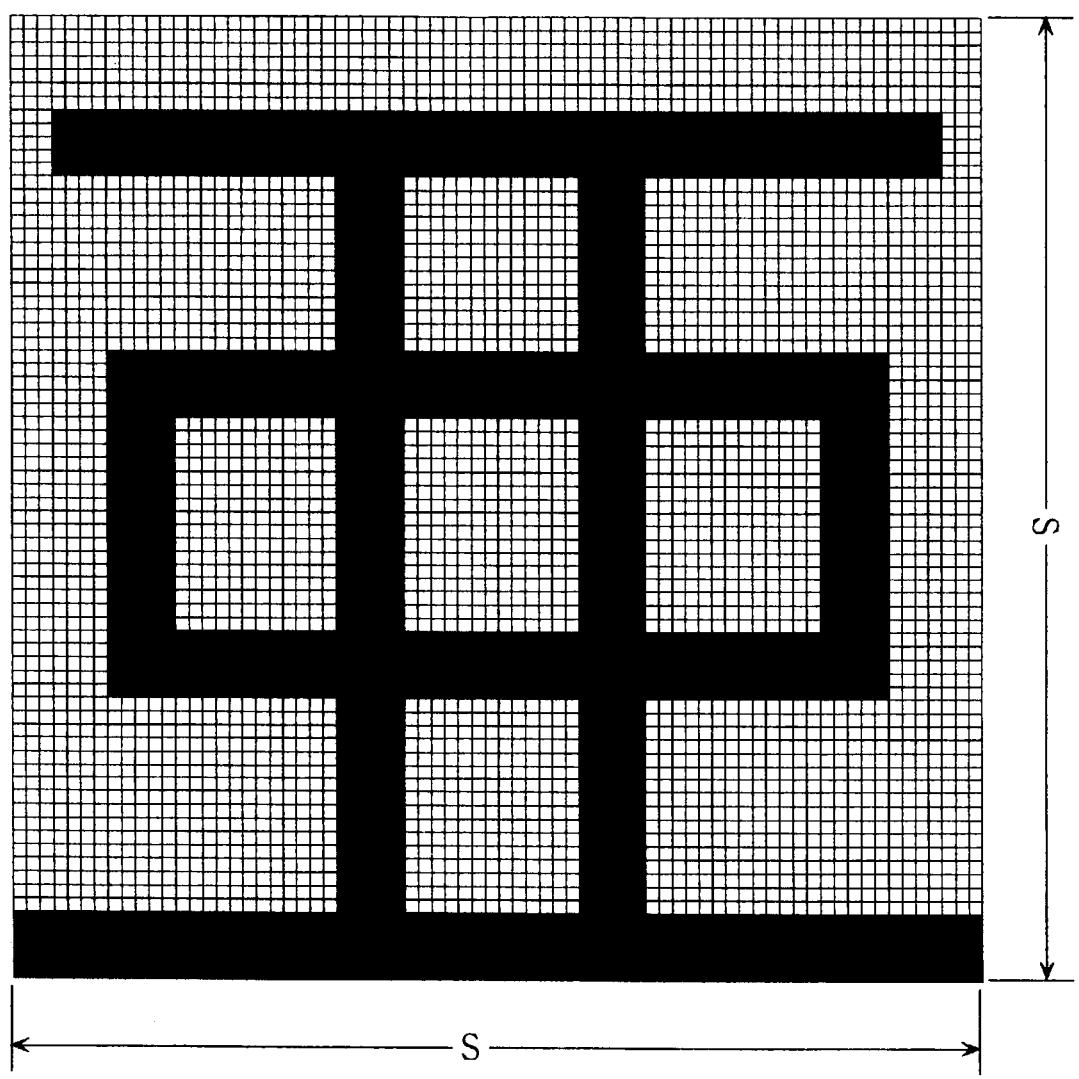
FIG. 5 is a diagram showing developed image data item of Gothic typeface which expresses a basic image of the kanji character "亜"

FIG. 5 illustrates developed image data item obtained by developing font data (basic image data) of a kanji character "亜" of Gothic typeface into a dot matrix of 72×72 dots (character size S=72). In the following, description will be made of examples of forming print image data of the kanji character "亜" in various typefaces.

First, when Gothic typeface is designated, i.e. if the Gothic typeface flag is set, it is determined that no modification is required (No to S1 in FIG. 2), and the character size (S) is read from the character size-storing area (at the step S23 in FIG. 2). Then the font data for the character is developed as shown in FIG. 5 (S25). The image data illustrated in FIG. 5 is outputted as print image data, followed by terminating the print image-forming processing (step S9). When Mincho typeface is designated as well, similar processing is carried out since no modification is required.

On the other hand, if Round-Gothic typeface is designated, i.e. if the Round-Gothic typeface flag is set, it is determined that a modification is required (Yes to S1), and then it is determined at the step S2 that the modification required is not the thickening modification (No to S2), followed by reading the character size S from the character size-storing area at the step S3. Then, from the character size S, a decremental size X is determined at a step S4. Values of the decremental size X for a rounding modification are defined in a table shown in FIG. 3B1 in a manner corresponding to respective values of the character size S. In the present case of the kanji character "亜", the character size S is assumed to be equal to 72, so that the decremental size X is equal to 2. When S≧72 holds, the table defines that the diagonally-superposing processing, described hereinafter, should be carried out.

When the decremental size X (=2) is determined at the step S4, then the font development is carried out at a step S5. That is, at this step, as shown in FIGS. 3B2 and 6, the basic image data of the kanji character "亜" in Gothic typeface is developed into a dot matrix reduced by 2X dots (2×2=4 dots in the present case) in both vertical and horizontal directions to thereby form a developed image data item having the size of 68×68 dots.

When the font development for the character (S5) is terminated, then shifted image data items are formed by displacing or shifting the developed image data item by 2X dots in vertical and horizontal directions, and the resulting shifted image data items are superposed on the original developed image data item. More specifically, superposed on the developed image data item of the kanji character "亜" having the size of 68×68 dots as shown in FIG. 6 are main shifted image data items formed by shifting the developed image data item by X=2 dots in upward, downward, rightward, and leftward directions, as viewed e.g. in FIG. 5, i.e. a primary upward-shifted image data item, a primary downward-shifted image data item, a primary rightward-shifted image data item, and a primary-leftward-shifted image data item, and secondary shifted image data items formed by shifting the developed image data item by X=1 dot in upward, downward, rightward, and leftward directions, i.e. a secondary upward-shifted image data item, secondary downward-shifted image data, a secondary rightward-shifted image data item, and a secondary leftward-shifted image data item, to thereby form image data formed of 72×72 dots (character size S=72) as shown in FIG. 7.

Figure 6:
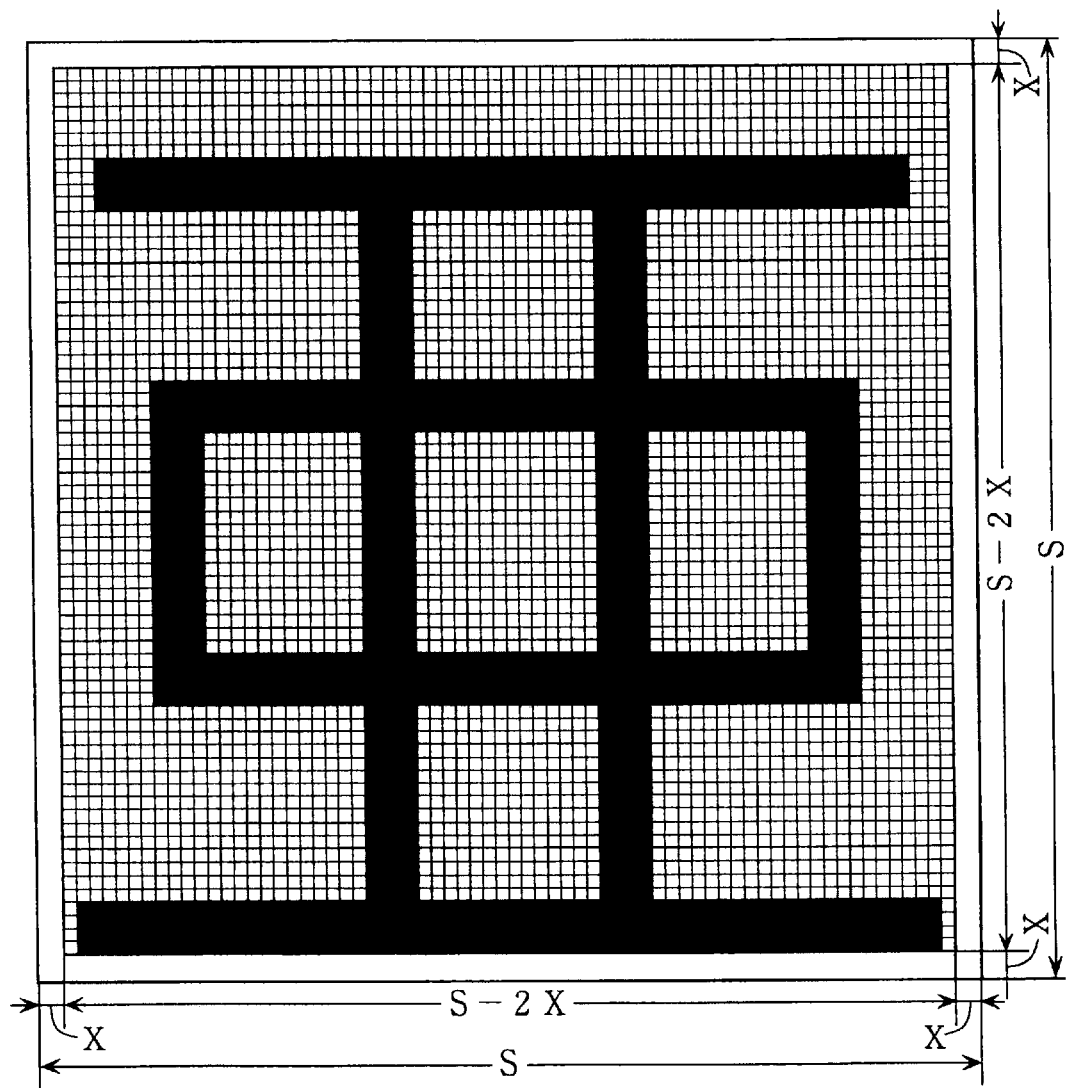
FIG. 6 is a diagram showing a developed image data item of the kanji character "亜" before execution of a thickening-rounding modification.
Figure 7:
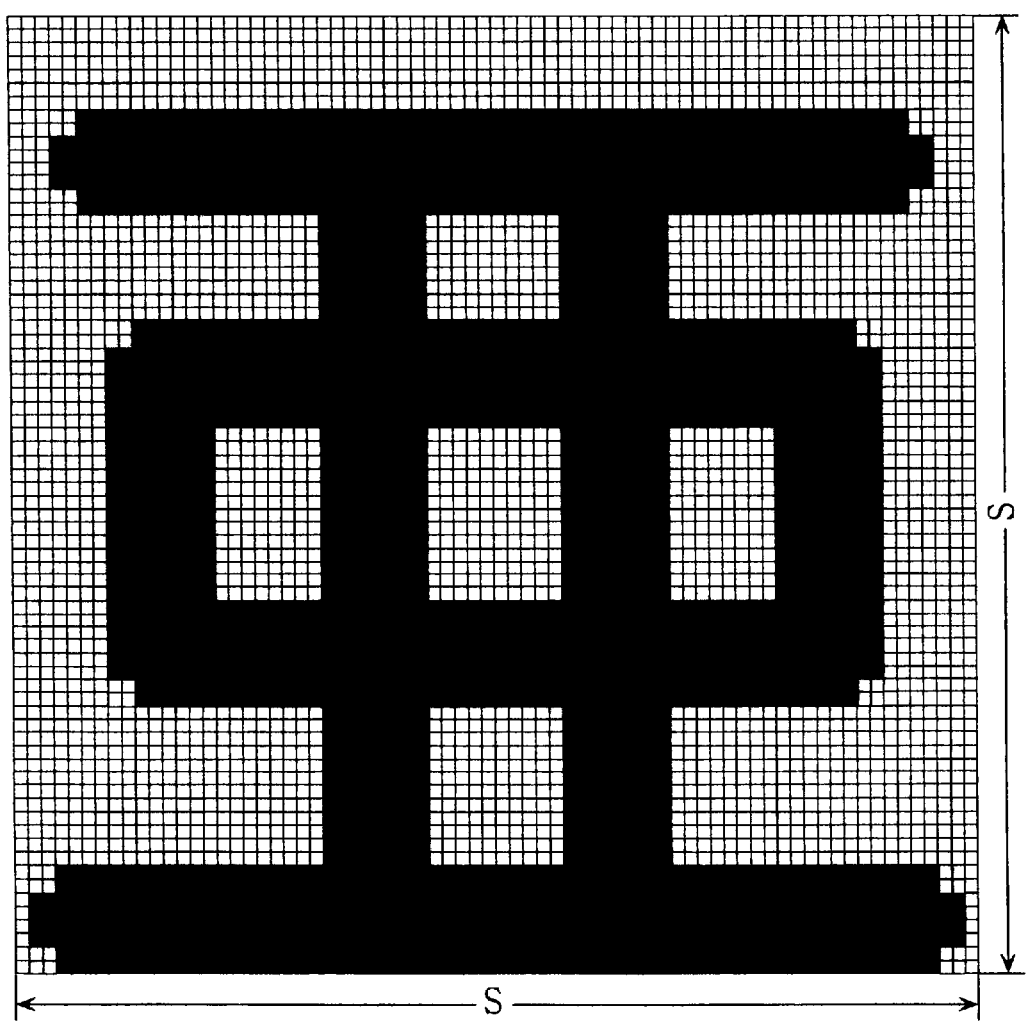
FIG. 7 is a diagram showing image data formed by superposing vertically-shifted and horizontally-shifted image data items on the FIG. 6 developed image data item before execution of diagonally-superposing processing.

The superposing of the data of these various shifted images on the developed image data item at the step S6 gives image data in which portions of images by a group or area of pixels (dots) forming the image of the developed image data item (e.g. as shown in FIG. 6) is increased in width by X (=2) dots in all of the upward, downward, rightward and leftward directions as shown in FIG. 7. Since this image data is formed by expanding the FIG. 6 image data which is made smaller than the target image data (S=72) by 2X dots in the vertical and horizontal directions, i.e. formed by a dot matrix of 68×68 dots, the image data conforming to the character size S (=72) is formed as shown in FIG. 7. (Other examples or variations of the superposing processing at the step S6 will be described hereinbelow.)

When the superposing of additional 2X dots in the vertical and horizontal directions is terminated at the step S6, then it is determined at the step S7 whether or not the character size S≧72 holds. If S≧72 holds, the diagonally-superposing processing is carried out at a step S8, and the resulting image data is outputted as print image data, whereas if S<72 holds, the image data corresponding to the one shown in FIG. 7 is outputted as the print image data, followed by terminating the print image-forming processing at the step S9.

In the diagonally-superposing processing at the step S8, superposed on the FIG. 7 image data are a right-upward-shifted image data item formed by shifting the developed image data item e.g. as shown in FIG. 6 rightward by two dots (rightward shift Ir=2) and then upward by one dot (upward shift Iu=1), a right-upward-shifted image data item formed by shifting the developed image data item rightward by one dot (rightward shift Ir=1) and then upward by two dots (upward shift Iu=2), a right-downward-shifted image data item formed, similarly, by a rightward shift Ir=2 and a downward shift Id=1, a right-downward-shifted image data item formed by a rightward shift Ir=1 and a downward shift Id=2, a left-upward-shifted image data item formed by a leftward shift Ir=2 and an upward shift Iu=1, a left-upward-shifted image data formed by a leftward shift Ir=1 and an upward shift Iu=2, a left-downward-shifted image data item formed by a leftward shift Ir=2 and a downward shift Iu=1, and a left-downward-shifted image data item formed by a leftward shift Ir=1 and a downward shift Iu=2, to thereby form print image data as shown in FIG. 8. As to the above-described manners of forming the image data items shown in FIG. 7 and FIG. 8, reference should be also made to FIG. 12A and FIG. 12B, respectively.

This diagonally-superposing processing at the step S8 makes it possible to form print image data which, when printed, presents images of characters which appear to have rounded corners, even when the character size S is large. That is, when the FIG. 7 image data is subjected to the diagonally-superposing processing, the image data which has rounded corners as shown in FIG. 8 can be produced. On the other hand, if the character size S is small, the diagonally-superposing processing (S8) is omitted, since blank areas at the corners of the characters are sensed as areas having natural curvature when printed even if the diagonally-superposing processing (S8) is omitted. Other examples or variations of the diagonally-superposing processing executed at the step S8 will also be described hereinbelow.

As described above, according to the printing apparatus 1 to which the print image-forming method and device of the present invention is applied, when Round-Gothic typeface is designated as the typeface, the basic image data (font data) of Gothic typeface read from the ROM_F23 is developed into developed image data item, and then modified by thickening the lines of an image of a character both in vertical and horizontal directions, and at the same time rounding corners of the thickened lines to thereby form image data of Round-Gothic typeface. When Round-Mincho typeface is designated as the typeface, the basic image data of Mincho typeface is developed and then subjected to a similar thickening-and-rounding modification to thereby form image data of Round-Mincho typeface.

Further, corners of lines forming the character can be formed rectangular by carrying out the diagonally-superposing processing by the use of diagonally-shifted image data items formed such that recesses at corners of the characters are completely filled with positive dots or pixels for the image. This can be also applied to cases in which original basic image data is data of symbols, figures or the like. That is, according to the print image-forming method and device of the present invention, it is possible to form print image data as desired without being provided in advance with various kinds of basic image data which are different only in the thickness and roundness of corners of lines of images.

It is possible to form image data which is different only in thickness of lines in a predetermined direction by using part of the function of thickening-and-rounding modification. That is, since the image data of Mincho typeface as shown in FIG. 4A1 can be converted to the image data of Round-Mincho typeface as shown in FIG. 4A2, it is possible to convert the image data of Mincho typeface to image data of Bold-Mincho typeface shown in FIG. 4A3 by thickening the lines only in horizontal directions through utilization of part of the function of the thickening-and-rounding modification. Similarly, it is possible to convert the image data of Gothic typeface shown in FIG. 4B1 to image data of Bold-Gothic typeface shown in FIG. 4B3. However, in the present embodiment, the thickening modification is executed in a different flow or sequence of steps in the FIG. 2 processing, because of ease of forming a control program. Now, the thickening modification will be described hereinafter.

Referring to FIG. 2, first, if Bold-Gothic typeface is designated and hence the Bold-Gothic typeface flag is set, it is determined that the modification is required (Yes to S1), and that the modification required is the thickening modification (Yes to t S2). Then, the character size S is read from the character size-storing area at the step S13. Then, the decremental size X is determined by the definitions set as shown in FIG. 3A1 table according to the character size S. For example, in the illustrated example of the kanji character "亜", the character size S is equal to 72 and hence the decremental size X is equal to 3. Then, the font data is developed at a step S15, whereby the basic image data (of the kanji character "亜") of Gothic typeface is developed into a dot matrix which is reduced in size by X (=3) dots in a horizontal direction to form developed image data item of 72×69 dots.

Then, shifted image data items are formed by shifting the developed image data item by X dots in the horizontal direction, and the shifted image data items thus obtained are superposed on the original developed image data item to form print image data (S16), followed by terminating the print image-forming processing (S9). For example, a primary rightward-shifted image data item formed by shifting the developed image data item of the kanji character "亜" in FIG. 9 by X=3 dots in the rightward direction, and two items of secondary rightward-shifted image data formed by shifting the developed image data item in the rightward direction by two dots, and one dot, respectively, are superposed on the developed image data item to form print image data having a size of 72×72 dots(character size S=72) as shown in FIG. 10.

Figure 10:
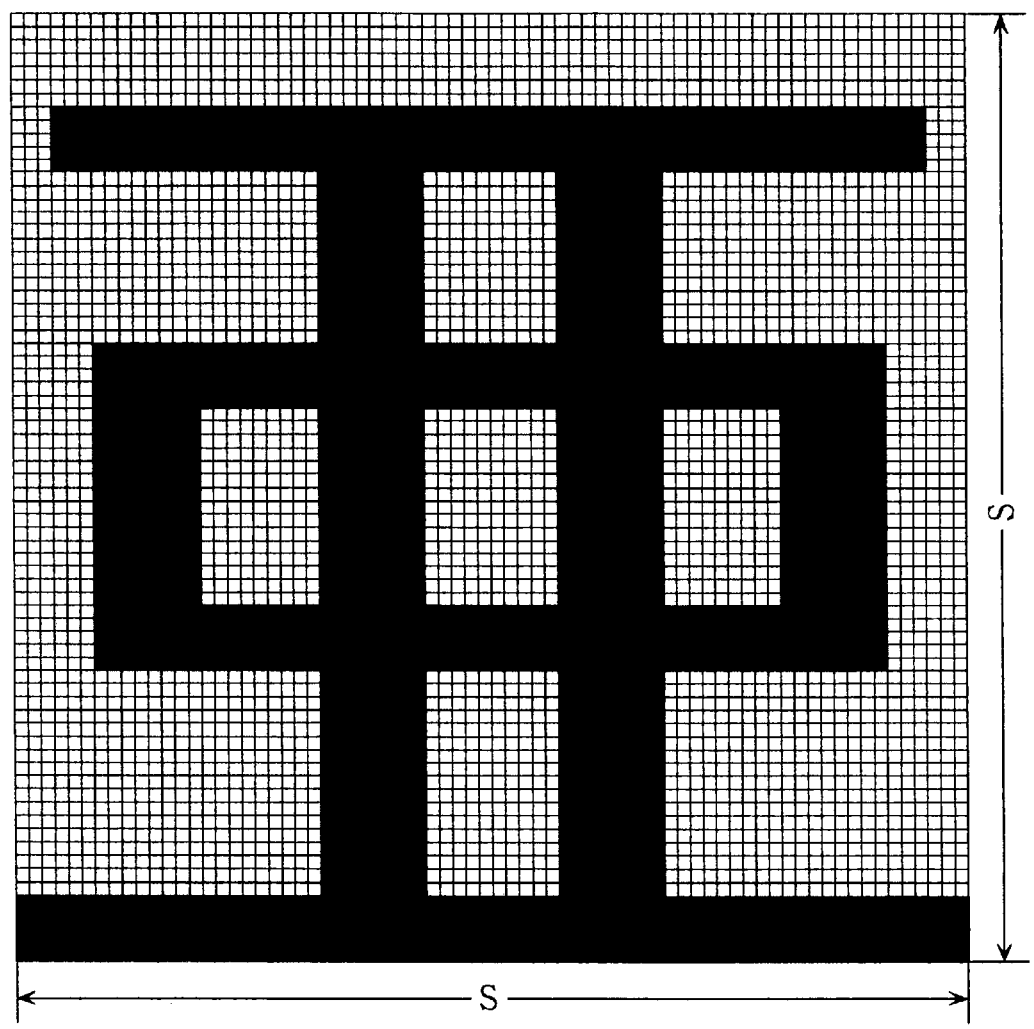
FIG. 10 is a diagram showing print image obtained by the thickening modification of the FIG. 9 developed image data item.

The superposing of three items of the rightward-shifted image data on the developed image data item (S16) makes it possible to form print image data (e.g. as shown in FIG. 10) in which a group or area of pixels (dots) forming the image of the developed image data item (e.g. as shown in FIG. 9) is increased in width in the rightward direction by X (=3) dots as shown in FIG. 10. This image data is formed by expanding the FIG. 9 image data which is made smaller than the target imaged data by X dots in the horizontal direction, i.e. formed by a dot matrix of 72×69 dots. Therefore, the image data conforming to the character size S (=72) is formed.

Further, thickening modification similar to the above can be carried out in a vertical direction of thicken the width of horizontal lines of images. This means that according to the present invention, it is possible to form print image data having a desired thickness only by increasing the width of lines forming letters and figures of original font in a vertical or horizontal direction, even if the printing apparatus is not provided in advance with various kinds of basic image data which are different in the thickness of the lines.

Figure 11A:
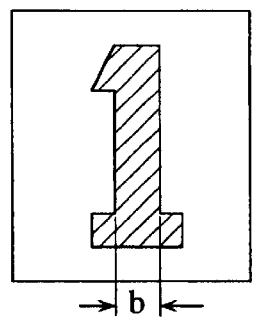
FIGS. 11A to 11G are diagrams which are useful in explaining a variation of processing for superposing vertically-shifted image data items and horizontally shifted image data items on the developed image data item.
Figure 11B:
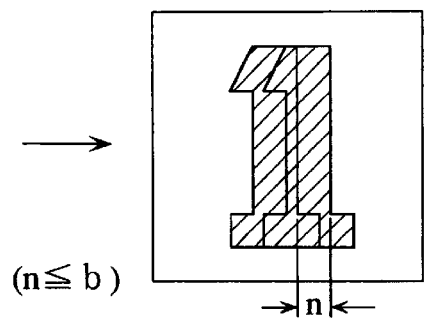

Now, the aforementioned other examples or variations of the superposing processing of various items of shifted image data on the developed image data item which should be executed at the step S6 or S16 in FIG. 2 will be described. First, superposed on developed image data item of a numeric character "1" formed by an area or group of dots which are continuous in a horizontal direction by four dots (pixels), i.e. developed image data item with horizontal width b=4, as shown in FIG. 11A, is a primary rightward-shifted image data item formed by shifting the developed image data item by n=3 dots in the horizontal direction (n≦b in this case), whereby the adjacent groups of dots each representing the numeric character "1" are joined to form image data having a width increased by n=3 dots (see FIG. 11B). However, if the primary rightward-shifted image data item formed by a horizontal shift of n=9 dots (n>b in this case) is superposed on the developed image data item, the groups of dots representative of "1" are discontinuous, forming doubled images (see FIG. 1C).

Figure 11C:
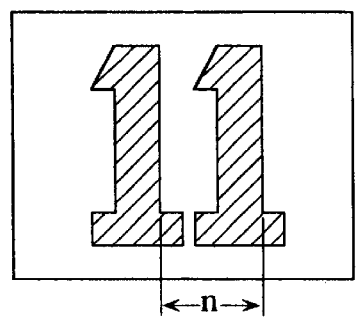
Figure 11D:
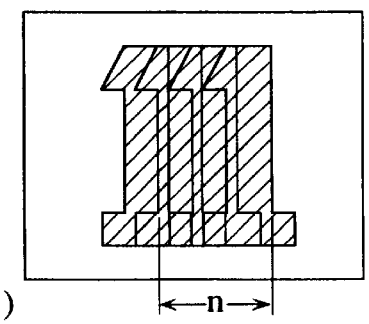
Figure 11E:
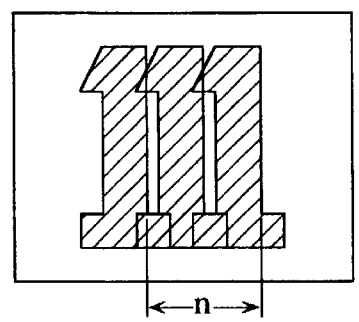

To form a continuous image area, if two items of secondary rightward-shifted image data formed by horizontal shifts of three dots and six dots are further superposed on the FIG. 11C data, the developed image data item and the primary rightward-shifted image data item are made continuous with each other by the secondary shifted image data items, whereby the width of the original developed image data item can be increased by nine dots. Further, when a secondary rightward-shifted image data item formed by a horizontal shift of five dots is superposed between the developed image data item and the primary rightward-shifted image data item, a deformed image can be obtained which is formed by partly-continuous groups of pixels or dots (see FIG. 11E). The relationship of items of developed image data item and shifted image data, and image data formed by superposing of the data items also holds not only with respect to the horizontal shift of image data described above but also with respect to the vertical shift of the same.

Figure 11F:
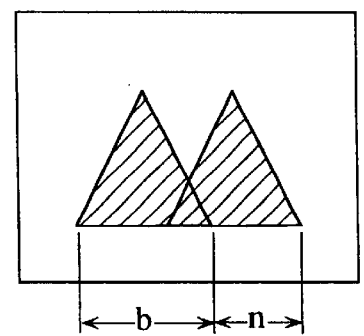
Figure 11G:
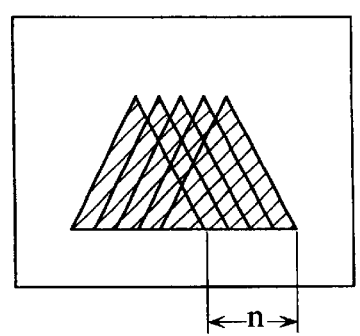

Therefore, by permitting a change in details of the superposing processing executed at the step S6 or S16 in FIG. 2 through designation by entry via the keyboard 4, it is possible to obtain variations of image data as described above. In this connection, the FIG. 7 image data and the FIG. 10 image data are respectively formed by superposing, on the developed image data item shown in FIG. 6 and the developed image data item shown in FIG. 9, respective secondary shifted image data items formed by a shift of one dot. This is because details of the superposing processing (at the step S6 or S16) are defined such that even triangle areas shown in FIG. 11F can be formed into a substantially smooth continuous area. Therefore, in the case of the illustrated example of the kanji character "匪" of Gothic typeface, similarly to the FIG. 11B in which n≦b holds, groups of dots or pixels of the developed imaged data item and the primary shifted image data item become immediately adjacent or continuous with each other. Therefore, the FIG. 7 and FIG. 10 image data can be formed without superposing the secondary shifted image data items, i.e. by omitting the processing for forming and superposing the secondary shifted image data items.

Figure 12A:
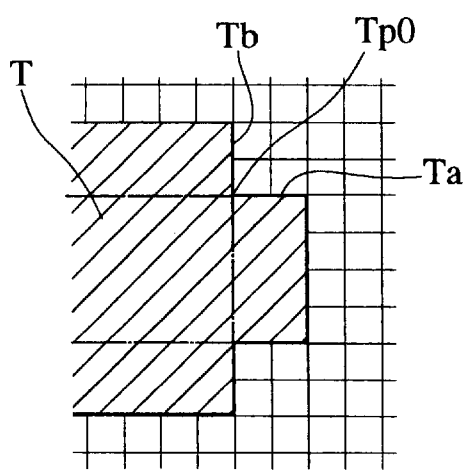
FIGS. 12A to 12F are diagrams which are useful in explaining a variation of the diagonally-superposing processing.
Figure 12B:
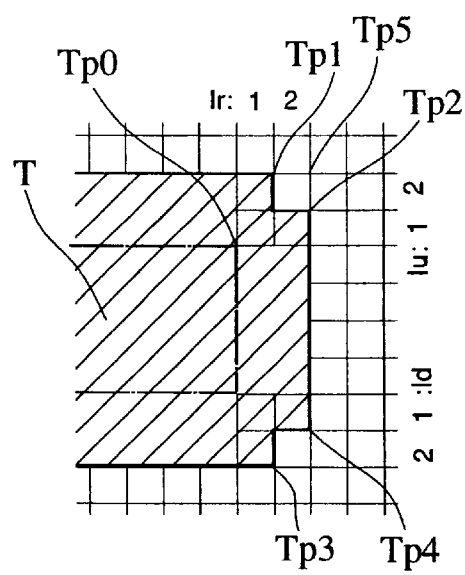

Next, a variation of the diagonally-superposing processing at the step S8 will be described. A hatched area in FIG. 12A represents a portion of dots at a right end of a horizontal line in FIG. 7 (dark area in the figure), while FIG. 12B corresponds to FIG. 8. Further, a portion designated by T which is surrounded by a one-dot-chain line represents a right end portion of the corresponding horizontal line in the original developed image data item shown in FIG. 6. When the developed image data item, vertically-shifted image data items, and horizontally-shifted image data items are superposed on each other, a rectangular blank area is formed which has adjacent sides at right angles to each other, i.e. a side Ta formed by an edge of the rightward-shifted image data item resulting from a rightward shift of two dots and a side Tb formed by an edge of the upward-shifted image data resulting from an upward shift of two dots. Therefore, in the diagonally-superposing processing (S8), diagonally-shifted image data items are formed such that at least part of the rectangular blank area can be filled by positive dots when they are superposed on the other image data items. The image data formed by the rounding processing by the use of such diagonally-shifted image data items is shown in FIG. 12B.

In this case, a point Tp1 at an upper right corner of a right-upward-shifted image data item formed by shifting the developed image data item by one dot in a rightward direction (rightward shift Ir=1) and by two dots in an upward direction (upward shift Iu=2) comes to a point shifted from a point Tp0 at an upper right corner of the right end portion T of the developed image data item rightward by one dot and upward by two dots. Similarly, a point Tp2 at an upper right corner of right-upward-shifted image data resulting from a rightward shift Ir=2 and an upward shift Iu=1 comes to a point shifted from the point Tp0 rightward by two dots and upward by one dot. When the FIG. 12B image data is printed, the line connecting between the points Tp1 and Tp2 are sensed as if they form a round corner. Further, as to a lower right corner of the horizontal line, by superposing items of right-downward-shifted image data formed by respective combinations of rightward shifts Ir=1 and 2, and downward shifts Id=2 and 1 on the FIG. 12A image data, points Tp3 and Tp4 at corners of the resulting image data similarly impart the impression of roundness thereto. Further, if a right-upward-shifted image data formed by rightward shift Ir=2 and upward shift Iu=2 is formed, the point at an upper right corner of the right-upward-shifted image data comes to a point Tp5 shown in FIG. 12B, and when it is further superposed on the FIG. 12B image data, the corner of the resulting image data is formed rectangular.

Figure 12C:
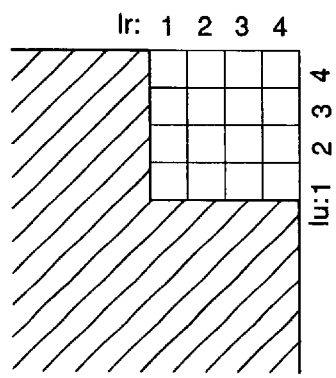
Figure 12D:
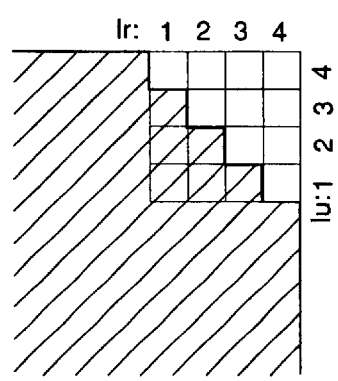
Figure 12E:
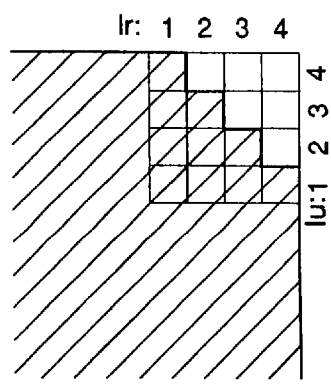
Figure 12F:
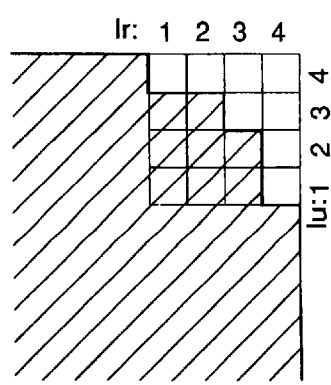

When the above corner-treatment processing is developed, a blank area formed on a corner of an image shown in FIG. 12C can be subjected to various corner treatments to form image data items, for example, as illustrated in FIGS. 12D to 12F, in which the corner of the image is varied such that it gives different impressions. More specifically, as shown in FIG. 12D, if upper right corners of right-upward-shifted image data items are arranged along a rightward-descending diagonal line of a 4×4-dot blank area at a corner of a figure, the printed image gives an impression that the corner has a curvature which is slightly concave. On the other hand, the image of FIG. 12E gives impressions similar to that of FIG. 8, while the image of FIG. 12F gives impressions having increased roundness.

Figure 13A:
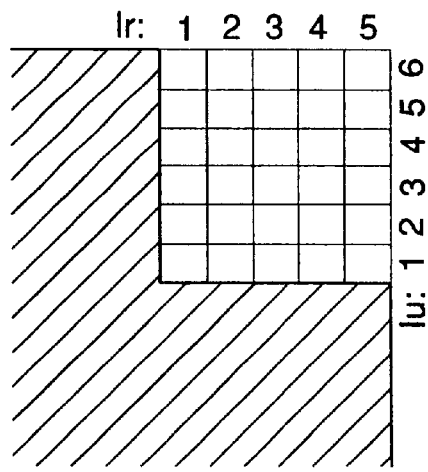
FIGS. 13A to 13D are diagrams similar to FIGS. 12A to 12F, which are useful in explaining a variation of the diagonally-superposing processing in which vertical shifts and horizontal shifts of the developed image data item are made in different amounts.

In the examples described heretofore, shifted image data items are formed by shifting the developed image data item by the same number of dots and superposed on the developed image data item. This corner treatment can be similarly carried out on image data formed by superposition of shifted image data items formed by shifting the developed image data item by different numbers of dots between a vertical direction and a horizontal direction. For example, as shown in FIG. 13A, when there are superposed on the developed image data item a primary upward-shifted image data item formed by a upward shift by n=6 dots (corresponding to a vertical decremental size X=6 in FIG. 3B1) and a primary rightward-shifted image data item formed by a rightward shift by k=5 dots (corresponding to a horizontal decremental size X=5 in FIG. 3B1), a rectangular blank area having a size of n (=6)×k (=5) dots is formed at a corner of the resulting image. To make such a corner appear to be more rounded than when the print image data is printed without the corner treatment, the diagonally-superposing processing is carried out by forming diagonally-shifted image data items through using the numbers of dots for vertical shifts as respective guide dot numbers each of which is calculated such that it is equal to or larger than the maximum integer "a" equal to or smaller than n×(1−i/k) with respect to a horizontal shift of i dots (i≧1), and superposing the diagonally-shifted image data items thus formed on the FIG. 13A image data.

More specifically, in FIG. 13A, for a rightward shift Ir=1, n×(1−Ir/k)=6×(1−1/5)=4.8 results, so that a guide dot number for a horizontal shift Ir=1, a1 is equal to 4. Similarly, a guide dot number a2=3 for a rightward shift Ir=2, a guide dot number a3=2 for a rightward shift Ir=3, a guide dot number a4=1 for a rightward shift Ir=4, a guide dot number a5=0 for a rightward shift Ir=5 are obtained. As a result, in correspondence to rightward shifts Ir=1, 2, 3, 4, and 5, g items (0≦g≦5) of five items of right-upward-shifted image data items are formed by upward shifts Iu respectively equal to an integer selected from 4 to 6, an integer selected from 3 to 6, an integer selected from 2 to 6, an integer selected from 1 to 6, and an integer selected from 0 to 6, and then superposed on the FIG. 13A image data. It goes without saying that if g=0, print image data remains as shown in FIG. 13A.

Figure 13B:
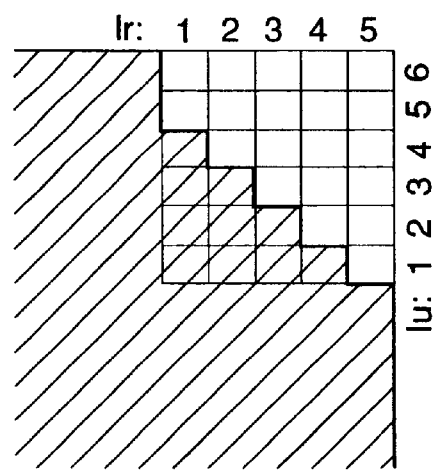

FIG. 13B shows an example in which upward shifts Iu of shifted image data items are equal to 4, 3, 2, 1, and 0 for respective rightward shifts Ir=1 to 5. That is, in this figure, the diagonally-superposing processing is carried out by superposing, on the developed image data item, four right-upward-shifted image data items formed by shifting the original developed image data item by respective combinations of a rightward shift Ir=1 and an upward shift Iu=4, a rightward shift Ir=2 and an upward shift Iu=3, a rightward shift Ir=3 and an upward shift Iu=2, and a rightward shift Ir=4 and an upward shift Iu=1, to thereby form print image data having a corner which is slightly concave with respect to a diagonal line extending from an upper left corner of a rectangular blank area of 6×5 dots to a lower right corner of the same.

Figure 13C:
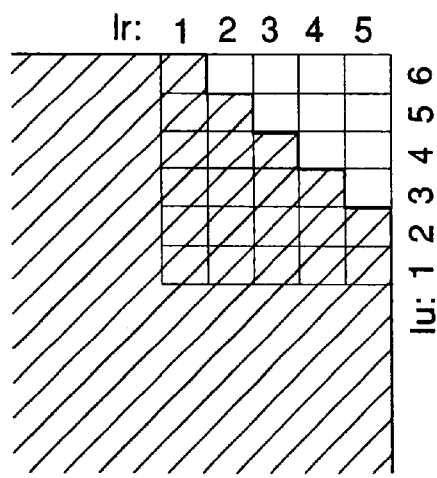
Figure 13D:
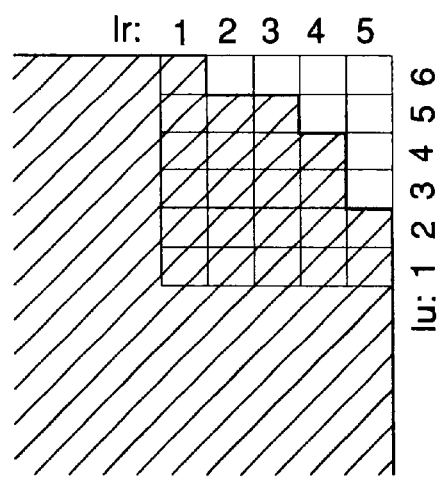

Similarly, FIG. 13C shows print image data obtained by the diagonally-superposing processing executed by superposing, on the FIG. 13A image data, five right-upward-shifted image data items formed by shifting the developed image data item by respective combinations of rightward shifts Ir=1, 2, 3, 4 and 5 and upward shifts Iu=6, 5, 4, 3 and 2. Thus, the FIG. 13C print image data can be formed which has a corner which is slightly expanded compared with the corner of the FIG. 13B print image data. Further, FIG. 13D shows print image data obtained by the diagonally-superposing processing executed by superposing, on the FIG. 13A image data, five right-upward-shifted image data items formed by shifting the developed image data item by respective combinations of rightward shifts Ir=1, 2, 3, 4 and 5 and upward shifts Iu=6, 5, 5, 4 and 2. Thus, as shown in FIG. 13D, print image data can be formed which has a corner which is imparted with more roundness than the corner of FIG. 13C. In this case, superposing four of the right-upward shift data items by omitting the right-upward shifted data item by the rightward shift Ir=2 and the upward shift Iu=5 gives the same results.

Further, by superposing five of right-upward-shifted image data items formed by a upward shift Iu=6 for all rightward shifts Ir=1 to 5, or by superposing a single right-upward-shifted image data item formed by a rightward shift Ir=5 and a upward shift Iu=6, print image data having a rectangular corner can be formed. To obtain print image data of a modified image having such rectangular corners, the above method of diagonally-superposing processing can be replaced by a two-stage variation thereof, i.e. a method having first and second stages of the process.

More specifically, according to the above embodiment of the print image-forming method described heretofore, as shown in FIGS. 14A1 to 14A5, print image data of an image having a rectangular corner is obtained by the treatment of corners by the diagonally-superposing processing which includes the following steps of:

(1) A developed image data item as basic data is obtained (FIG. 14A1).

(2) A vertically-shifted image data item is obtained which is formed by shifting the developed imaged data in a vertical direction (FIG. 14A2).

(3) In parallel with the step (2), a horizontally-shifted image data item is obtained which is formed by shifting the developed image data item in a horizontal direction (FIG. 14A3).

(4) All of the developed image data item, a vertically-shifted image data item, and horizontal image data item are superposed on each other (FIG. 14A4).

(5) The diagonally-superposing processing is carried out to fill a blank area at a corner formed in the superposed image data (FIG. 14A5).

According to the variation of the two-stage method of the diagonally-superposing processing, as shown in FIGS. 14B1 to 14B4, print image data of an image having a rectangular corner is obtained by the following steps of:

(1') A developed image data item as basic data is obtained (FIG. 14B1).

(2') A vertically-shifted image data item is obtained which is formed by shifting the developed imaged data, in a vertical direction (FIG. 14B2).

(3') A temporary developed image data item is obtained by superposing the vertically-shifted image data item on the developed image data item (FIG. 14B3).

(4') A horizontally-shifted image data item is obtained which is formed by shifting the temporary developed image data item in a horizontal direction (FIG. 14B4).

(5') The temporary developed image data item and the horizontally-shifted image data are superposed on each other (FIG. 14B4).

In this case, the print image data may also be obtained by reversing the order of the above steps (2') and (4') to thereby form horizontally-shifted image data first and then obtain temporary developed image data item using the same.

The invention is not limited in its application to the embodiment and variations described heretofore, but it can be practiced or carried out in various ways.

For example, although in the thickening modification described hereinabove, shifted image data items are formed by shifting the developed image data item by the same number of, i.e. X dots in each of the upward, downward, rightward and leftward directions, this is not limitative, but the number of dots for a shift may be set to different values depending on the direction of shifting the developed image data item, to thereby obtain unique image variations. Further, various other settings of the print image-forming processing may be employed, including settings for forming only an upward-shifted image data item and a rightward-shifted image data item and superposing the resulting data item on the developed image data item.

Further, the above description of the embodiment and variations thereof with reference to the drawings are made of a case in which print images are positive, i.e. expressed by areas or groups of dots or pixels to be printed. When print images are negative, i.e. expressed by blank areas which are not printed, it is possible to obtain image data of images similarly modified by regarding pixels or dots defining the blank areas as the pixels for expressing the print image. In this case, when the thickening-and-rounding modification or the thickening modification is carried out by superposing image data items such that the pixels expressing the print image, i.e. the blank areas, overrides dark areas, whereby image data of modified images which are increased in width, i.e. reduced in width of printing areas can be obtained. Further, although in the above embodiment, the outline font is employed as the font data stored within the ROM_F23, this is not limitative but it goes without saying that the same effects can be obtained when bit map fonts are used.

It is further understood by those skilled in the art that the foregoing are preferred embodiments of the invention, and that various changes and modification may be made without departing from the spirit and scope thereof.

What is claimed is:

1. A print image-forming method of forming print image data of a dot matrix in which print portions are represented by positive dots and blank portions are represented by negative dots, comprising the steps of:

reading basic image data formed in a manner such that when said basic image data is developed into said dot matrix, a group of image pixels formed by one of a set of positive dots and a set of negative dots is capable of representing a basic image, from a memory device;

forming a developed image data item representative of said basic image by developing said basic image data read from said memory device into a dot matrix which is smaller in size, in terms of having a smaller number of dots, than said dot matrix of said print image data in at least one predetermined direction of a vertical direction and a horizontal direction;

forming at least one shifted image data item by shifting said developed image data item by units of dots in said at least one predetermined direction, said at least one shifted image data item including a primary shifted image data item formed by shifting said developed image data item by units of dots in said at least one predetermined direction and at least one secondary shifted image data item to be formed by shifting said developed image data item in said at least one predetermined direction by units of dots in a manner such that said group of image pixels becomes continuous between said developed image data item and said primary shifted image data item; and forming said print image data as print image data in which the basic image data is modified by causing said developed image data item, said primary shifted data item and said at least one secondary shifted image data item to be superposed, one upon another, in a manner such that said group of image pixels overrides background pixels.

2. A print image-forming method according to claim 1, wherein said step of forming said developed image data item includes developing said basic image data into a dot matrix which is smaller in size by n dots (n≧1) than said dot matrix of said print image data in said at least one predetermined direction, said step of forming said at least one shifted image data item including the steps of:

forming a primary shifted image data item by shifting said developed image data item by said n dots in said at least one predetermined direction, and forming m items (0≦m≦n−1) of n−1 items of secondary shifted image data to be formed by shifting said developed image data item in said at least one predetermined direction by 1, 2, . . . ,n−1 dots, respectively, in a manner such that said group of image pixels becomes continuous between said developed image data item and said primary shifted image data item, said step of forming said print image data including causing said developed image data item, said primary shifted image data, and said m items of said secondary shifted image data, to be superposed, one upon another.

3. A print image-forming method according to claim 1 or 2, wherein said at least one predetermined direction is said horizontal direction.

4. A print image-forming method according to claim 1 or 2, wherein said at least one predetermined direction is said vertical direction.

5. A print image-forming method according to claim 1, wherein said step of forming said developed image data item includes developing said basic image data into a dot matrix which is smaller in size than said dot matrix of said print image data in both of a vertical direction and a horizontal direction, said step of forming said at least one shifted image data item including the steps of:

forming at least one vertically-shifted image data item by shifting said developed image data item by units of dots in said vertical direction, and forming at least one horizontally-shifted image data item by shifting said developed image data item by units of dots in said horizontal direction, said step of forming said print image data including causing said developed image data item, said at least one vertically-shifted image data item, and said at least one horizontally-shifted image data item to be superposed, one upon another in a manner such that said group of image pixels overrides background pixels.

6. A print image-forming method according to claim 5, wherein said step of forming said developed image data item includes developing said basic image data into a dot matrix which is smaller in size than said dot matrix of said print image data by n dots (n≧1) in said vertical direction and by k dots (k≧1) in said horizontal direction, said step of forming said at least one shifted image data including the steps of:

forming a primary vertically-shifted image data item by shifting said developed image data item by said n dots in said vertical direction, forming a primary horizontally-shifted image data item by shifting said developed image data item by said k dots in said horizontal direction, and forming m items (0≦m≦n−1) of n−1 items of secondary vertically-shifted image data to be formed by shifting said developed image data item by 1, 2, . . . n−1 dots, respectively, in said vertical direction, and j items (0≦j≦k−1) of k−1 items of secondary horizontally-shifted image data to be formed by shifting said developed image data item by 1, 2, . . . k−1 dots, respectively, in said horizontal direction, in a manner such that said group of image pixels is made continuous between said developed image data item and said primary vertically-shifted image data item, and between said developed image data item and said primary horizontally-shifted image data item, said step of forming said print image data including causing said developed image data item, said primary vertically-shifted image data item, said m items of said secondary vertically-shifted image data, said primary horizontally-shifted image data item, and said j items of said secondary horizontally-shifted image data, to be superposed, one upon another.

7. A print image-forming method according to claim 1, wherein said step of forming said developed image data item includes developing said basic image data into a dot matrix which is smaller in size than said dot matrix of said print image data in both of a vertical direction and a horizontal direction, said step of forming said at least one shifted image data item including the steps of:

forming at least one vertically-shifted image data item by shifting said developed image data item by units of dots in said vertical direction, forming at least one horizontally-shifted image data item by shifting said developed image data item by units of dots in said horizontal direction, and forming at least one diagonally-shifted image data item by shifting said developed image data item by units of dots in a diagonal direction, in a manner such that said group of image pixels is made continuous over non-overlapping portions of said group of image pixels extending in said vertical direction and non-overlapping portions of said group of image pixels extending in said horizontal direction, said non-overlapping portions being formed when said developed image data item, said at least one vertically-shifted image data item, and said at least one horizontally-shifted image data item, are superposed, one upon another, said step of forming said print image data including causing said developed image data item, and said at least one vertically-shifted image data item, said at least one horizontally-shifted image data item, and said at least one diagonally-shifted image data item to be superposed, one upon another in a manner such that said group of image pixels overrides background pixels.

8. A print image-forming method according to claim 7, wherein said step of forming said developed image data item includes developing said basic image data into a dot matrix which is smaller in size than said dot matrix of said print image data by n dots (n≧1) in said vertical direction and by k dots (k≧1) in said horizontal direction, said step of forming said at least one shifted image data item including the steps of:

forming a primary vertically-shifted image data item by shifting said developed image data item by said n dots in said vertical direction, forming a primary horizontally-shifted image data item by shifting said developed image data item by said k dots in said horizontal direction, and forming m items (0≦m≦n−1) of n−1 items of secondary vertically-shifted image data to be formed by shifting said developed image data item by 1, 2, . . . n−1 dots, respectively, in said vertical direction, and j items (0≦j≦k−1) of k−1 items of secondary horizontally-shifted image data to be formed by shifting said developed image data item by 1, 2, . . . k−1 dots, respectively, in said horizontal direction, in a manner such that said group of image pixels is made continuous between said developed image data item and said primary vertically-shifted image data item, and between said developed image data item and said primary horizontally-shifted image data item, said step of forming said at least one diagonally-shifted image data item including forming g items (0≦g≦k) of k items of diagonally-shifted image data corresponding to respective horizontal shifts of i dots (k ≧i≧1) by shifting said developed image data item by respective combinations of said i dots in said horizontal direction and any of a, a+1, a+2, . . . and n dots (a is equal to an integer which is the largest of integers smaller than n×(1−i/k)) in said vertical direction, said step of forming said print image data including causing said developed image data item, said primary vertically-shifted image data item, said m items of said secondary vertically-shifted image data, said primary horizontally-shifted image data item, said j items of said secondary horizontally-shifted image data, and said g items of said diagonally-shifted image data, to be superposed, one upon another.

9. A print image-forming method according to claim 7, wherein said step of forming said developed image data item includes developing said basic image data into a dot matrix which is smaller in size than said dot matrix of said print image data by 2n dots (n≧1) in said vertical direction and by 2k dots (k≧1) in said horizontal direction, said step of forming said at least one shifted image data item including the steps of:

forming a primary upward-shifted image data item by shifting said developed image data item by said n dots in an upward direction, a primary downward-shifted image data item by shifting said developed image data item by said n dots in a downward direction, a primary rightward-shifted image data item by shifting said developed image data item by said n dots in a rightward direction, and a primary-leftward-shifted image data item by said n dots in a leftward direction, and forming Mu items (0≦Mu≦n−1) of n−1 items of secondary upward-shifted image data to be formed by shifting said developed image data item by 1, 2, . . . n−1 dots, in said upward direction, Md items (0≦Md≦n−1) of n−1 items of secondary downward-shifted image data to be formed by shifting said developed image data item by 1, 2, ... n−1 dots, respectively, in said downward direction, Jr items ($0 \leq Jr \leq k-1$) of k−1 items of secondary rightward-shifted image data to be formed by shifting said developed image data item by 1, 2, ... k−1 dots, respectively, in said rightward direction, and Ji ($0 \leq Ji \leq k-1$) of k−1 items of secondary leftward-shifted image data to be formed by shifting said developed image data item by 1, 2, ... k−1 dots in said leftward direction, in a manner such that said group of image pixels is made continuous between said developed image data item and said primary upward-shifted image data, between said developed image data item and said primary downward-shifted image data item, between said developed image data item and said primary rightward-shifted image data item, and between said developed image data item and said primary-leftward-shifted image data item, said step of forming said at least one diagonally-shifted image data item including forming Gru items ($0 \leq Gru \leq k$) of k items of rightward/upward-shifted image data corresponding to respective rightward shifts of Ir dots ($k \geq Ir \geq 1$) by shifting said developed image data item by respective combinations of said Ir ($k \geq Ir \geq 1$) dots in said rightward direction and any of Ar, Ar+1, Ar+2, ... and n dots (Ar is equal to an integer which is the largest of integers smaller than n×(1−Ir/k)) in said upward direction, Grd items ($0 \leq Grd \leq k$) of k items of rightward/downward-shifted image data corresponding to said respective rightward shifts of Ir dots ($k \geq Ir \geq 1$) by shifting said developed image data item by respective combinations of said Ir ($k \geq Ir \geq 1$) dots in said rightward direction and any of said Ar, Ar+1, Ar+2, ... and n dots in said downward direction, Glu items ($0 \leq Glu \leq k$) of k items of leftward/upward-shifted image data corresponding to respective leftward shifts of Il dots ($k \geq Il \geq 1$) by shifting said developed image data item by respective combinations of said Il ($Il \geq 1$) dots in said leftward direction and any of said Al, Al+1, Al+2, ... and n dots in said upward direction, and Gld items ($0 \leq Gld < k$) of k items of leftward/downward-shifted image data corresponding to said respective leftward shifts of Il dots ($k \geq Il \geq 1$) by shifting said developed image data item by respective combinations of said Il ($Il \geq 1$) dots in said leftward direction and any of said Al, Al+1, Al+2, ... and n dots in said downward direction, said step of forming said print image data including causing said developed image data item, said primary upward-shifted image data item, said Mu items of said secondary upward-shifted image data, said primary downward-shifted image data item, said Md items of said secondary downward-shifted image data, said primary rightward-shifted image data item, said Jr items of said secondary rightward-shifted image data, said primary-leftward-shifted image data item, said Jl items of said secondary leftward-shifted image data, said Gru items of said rightward/upward-shifted image data, said Grd items of said rightward/downward-shifted image data, said Glu items of said leftward/upward-shifted image data, and said Gld items of said leftward/downward-shifted image data, to be superposed, one upon another.

10. A print image-forming method according to claim 1, wherein said step of forming said developed image data item includes developing said basic image data into a dot matrix which is smaller in size than said dot matrix of said print image data in both of a vertical direction and a horizontal direction, said step of forming said at least one shifted image data item including the steps of:
forming a first shifted image data item by shifting said developed image data item by units of dots in one of said vertical direction and said horizontal direction,
forming a temporary developed image data item by causing said developed image data item and said first shifted image data, to be superposed, one upon another, in a manner such that said group of said image pixels overrides background pixels, and
forming a second shifted image data item by shifting said temporary developed image data item by units of dots in the other of said vertical direction and said horizontal direction, and said step of forming said print image data including causing said temporary shifted image data and said second shifted image data, to be superposed, one upon another, in a manner such that said group of image pixels overrides said background pixels.

11. A print image-forming method according to claim 10, wherein said step of forming said developed image data item includes developing said basic image data into a dot matrix which is smaller in size than said dot matrix of said print image data by n dots ($n \geq 1$) in said vertical direction and by k dots ($k \geq 1$) in said horizontal direction, said step of forming said first shifted image data item including the steps of:
forming one of a primary vertically-shifted image data item to be formed by shifting said developed image data item by said n dots in said vertical direction and a primary horizontally-shifted image data item to be formed by shifting said developed image data item by said k dots in said horizontal direction, as said first shifted image data item,
forming m items ($0 \leq m \leq n-1$) of n−1 items of secondary vertically-shifted image data to be formed by shifting said developed image data item by 1, 2, ... n−1 dots, respectively, in said vertical direction, in a manner such that said group of image pixels is made continuous between said developed image data item and said primary vertically-shifted image data item, when said primary vertically-shifted image data item is formed as said first shifted image data item, and
forming j items ($0 \leq j \leq k-1$) of k−1 items of secondary horizontally-shifted image data to be formed by shifting said developed image data item by 1, 2, ... k−1 dots, respectively, in said horizontal direction, in a manner such that said group of image pixels is made continuous between said developed image data item and said primary horizontally-shifted image data item, when said primary horizontally-shifted image data item is formed as said first shifted image data item, said step of forming said temporary developed image data item including the steps of:
causing said developed image data item, said primary vertically-shifted image data item and said m items of said secondary vertically-shifted image data, to be superposed, one upon another, when said first shifted image data is said primary vertically-shifted image data item, and
causing said developed image data item, said primary horizontally-shifted image data item, and said j items of said secondary horizontally-shifted image data, to be superposed, one upon another, when said first shifted image data item is said primary horizontally-shifted image data item, said step of forming said second shifted image data item including the steps of:
  forming a primary horizontally-shifted image data item by shifting said temporary developed image data item by k dots in said horizontal direction as said second shifted image data, and j items ($0 \leq j \leq k-1$) of k−1 items of secondary horizontally-shifted image data to be formed by shifting said developed image data item by 1, 2, . . . k−1 dots, respectively, in said horizontal direction, in a manner such that said group of image pixels is made continuous between said temporary developed image data item and said primary horizontally-shifted image data item, when said primary vertically-shifted image data is formed as said first shifted image data, and
  forming a primary vertically-shifted image data item by shifting said temporary developed image data item by said n dots in said vertical direction as said second shifted image data item, and m items ($0 \leq m \leq n-1$) of n−1 items of secondary vertically-shifted image data to be formed by shifting said developed image data item by 1, 2, . . .n−1 dots, respectively, in said vertical direction, in a manner such that said group of image pixels is made continuous between said temporary developed image data item and said primary vertically-shifted image data item, when said primary horizontally-shifted image data is formed as said first shifted image data, said step of forming said print image data including:
  causing said temporary developed image data item, said primary horizontally-shifted image data item, and said j items of said secondary horizontally-shifted image data, to be superposed, one upon another, when said primary horizontally-shifted image data is formed as said second shifted image data, and
  causing said temporary developed image data item, said primary vertically-shifted image data item, and said m items of said secondary vertically-shifted image data, to be superposed, one upon another, when said primary vertically-shifted image data item is formed as said second shifted image data item.

12. A print image-forming method according to claim 1, wherein said group of image pixels is increased in width in at least one of a vertical and a horizontal direction upon superposing said developed image data item and said at least one shifted image data item.

13. A print image-forming method according to claim 12, wherein said basic image defines a character size, and the character size does not change upon superposing said developed image data item and said at least one shifted image data item to form said print image data.

14. A print image-forming device, comprising:
  print image-storing means for storing print image data of a dot matrix in which print portions are represented by positive dots and blank portions are represented by negative dots;
  basic image-storing means for storing basic image data formed in a manner such that when said basic image data is developed into a dot matrix, a group of image pixels formed by one of a set of positive dots and a set of negative dots is capable of representing a basic image;
  developed image-forming means for developing said basic image data read from said basic-image-storing means into a dot matrix which is smaller in size, in terms of having a smaller number of dots, than said dot matrix of said print image data in at least one predetermined direction of a vertical direction and a horizontal direction, to form developed image data item representative of said basic image;
  shifted image data-forming means for forming at least one shifted image data by shifting said developed image data item by units of dots in said at least one predetermined direction, said at least one shifted image data including a primary shifted image data item formed by shifting said developed image data item by units of dots in said at least one predetermined direction and at least one secondary shift image data item to be formed by shifting said developed image data item in said at least one predetermined direction by units of dots in a manner such that said group of image pixels becomes continuous between said developed image data item and said primary shifted image data item; and
  print image-forming means for forming said print image as print image data in which the basic image data is modified by causing said developed image data item, said primary shifted data item and said at least one secondary shift image data item to be superposed, one upon another, in a manner such that said group of image pixels overrides background pixels.

15. A print image-forming device according to claim 14, wherein said developed image data item-forming means forms said developed image by developing said basic image data into a dot matrix which is smaller in size by n dots ($n \geq 1$) than said dot matrix of said print image data in said at least one predetermined direction,
  said shifted image data-forming means forming a primary shifted image data item by shifting said developed image data item by said n dots in said at least one predetermined direction, and forming m items ($0 \leq m \leq n-1$) of n−1 items of secondary shifted image data to be formed by shifting said developed image data item in said at least one predetermined direction by 1, 2, . . . , n−1 dots, respectively, in a manner such that said group of image pixels becomes continuous between said developed image data item and said primary shifted image data item,
  said print image-forming means forming said print image data by causing said developed image data item, said primary shifted image data item, and said m items of said secondary shifted image data, to be superposed, one upon another.

16. A print image-forming device according to claim 14 or 15, wherein said at least one predetermined direction is said horizontal direction.

17. A print image-forming device according to claim 14 or 15, wherein said at least one predetermined direction is said vertical direction.

18. A print image-forming device according to claim 14, wherein said developed image data item-forming means forms said developed image data item by developing said basic image data into a dot matrix which is smaller in size than said dot matrix of said print image data in both of a vertical direction and a horizontal direction,
  said shifted image-forming means forming at least one vertically-shifted image data item by shifting said developed image data item by units of dots in said vertical direction, and at least one horizontally-shifted image data item by shifting said developed image data item by units of dots in said horizontal direction,
  said print image-forming means forming said print image data by causing said developed image data item, said at least one vertically-shifted image data item, and said at least one horizontally-shifted image data item to be superposed, one upon another, in a manner such that said group of image pixels overrides background pixels.

19. A print image-forming device according to claim 18, wherein said developed image-forming means forms said developed image data item by developing said basic image data into a dot matrix which is smaller in size than said dot matrix of said print image data by n dots (n≧1) in said vertical direction and by k dots (k≧1) in said horizontal direction, said shifted image-forming means forming a primary vertically-shifted image data item by shifting said developed image data item by said n dots in said vertical direction, a primary horizontally-shifted image data item by shifting said developed image data item by said k dots in said horizontal direction, m items (0≦m≦n−1) of n−1 items of secondary vertically-shifted image data to be formed by shifting said developed image data item by 1, 2, . . . n−1 dots, respectively, in said vertical direction, and j items (0≦j≦k−1) of k−1 items of secondary horizontally-shifted image data to be formed by shifting said developed image data item by 1, 2, . . . .k−1 dots, respectively, in said horizontal direction, in a manner such that said group of image pixels is made continuous between said developed image data item and said primary vertically-shifted image data item, and between said developed image data item and said primary horizontally-shifted image data item, said print image-forming means forming said print image data by causing said developed image data item, said primary vertically-shifted image data item, said m items of said secondary vertically-shifted image data, said primary horizontally-shifted image data item, and said j items of said secondary horizontally-shifted image data, to be superposed, one upon another.

20. A print image-forming device according to claim 14, wherein said developed image-forming means forms said developed image data item by developing said basic image data into a dot matrix which is smaller in size than said dot matrix of said print image data in both of a vertical direction and a horizontal direction, said shifted image data-forming means including:
vertically-shifted image-forming means for forming at least one vertically-shifted image data item by shifting said developed image data item by units of dots in said vertical direction,
horizontally-shifted image-forming means for forming at least one horizontally-shifted image data item by shifting said developed image data item by units of dots in said horizontal direction, and
diagonally-shifted image-forming means for forming at least one diagonally-shifted image data item by shifting said developed image data item by units of dots in a diagonal direction, in a manner such that said group of image pixels is made continuous over non-overlapping portions of said group of image pixels extending in said vertical direction and non-overlapping portions of said group of image pixels extending in said horizontal direction, said non-overlapping portions being formed when said developed image data item, said at least one vertically-shifted image data item, and said at least one horizontally-shifted image data item are superposed, one upon another, said print image-forming means forming said print image data by causing said developed image data item, and said at least one vertically-shifted image data item, said at least one horizontally-shifted image data item, and said at least one diagonally-shifted image data item to be superposed, one upon another, in a manner such that said group of image pixels overrides background pixels.

21. A print image-forming device according to claim 20, wherein said developed image-forming device forms said developed image data item by developing said basic image data into a dot matrix which is smaller in size than said dot matrix of said print image data by n dots (n≧1) in said vertical direction and by k dots (k≧1) in said horizontal direction, said vertically-shifted image-forming means forming a primary vertically-shifted image data item by shifting said developed image data item by said n dots in said vertical direction, said horizontally-shifted image-forming means forming a primary horizontally-shifted image data item by shifting said developed image data item by said k dots in said horizontal direction, said shifted image-forming means including secondary shifted image-forming means for forming m items (0≦m≦n−1) of n−1 items of secondary vertically-shifted image data to be formed by shifting said developed image data item by 1, 2, . . .n−1 dots, respectively, in said vertical direction, and j items (0≦j≦k−1) of k−1 items of secondary horizontally-shifted image data to be formed by shifting said developed image data item by 1, 2, . . . .k−1 dots, respectively, in said horizontal direction, in a manner such that said group of image pixels is made continuous between said developed image data item and said primary vertically-shifted image data item, and between said developed image data item and said primary horizontally-shifted image data item, said diagonally-shifted image data-forming means forming g items (0≦g≦k) of k items of diagonally-shifted image data corresponding to respective horizontal shifts of i dots (k≧i≧1) by shifting said developed image data item by respective combinations of said i dots in said horizontal direction and any of a, a+1, a+2, . . . and n dots (a is equal to an integer which is the largest of integers smaller than n×(1−i/k)) in said vertical direction, said print image-forming means forming said print image data by causing said developed image data item, said primary vertically-shifted image data item, said m items of said secondary vertically-shifted image data, said primary horizontally-shifted image data item, said j items of said secondary horizontally-shifted image data, and said g items of said diagonally-shifted image data, to be superposed, one upon another.

22. A print image-forming device according to claim 20, wherein said developed image-forming means forms said developed image data item by developing said basic image data into a dot matrix which is smaller in size than said dot matrix of said print image data by 2n dots (n≧1) in said vertical direction and by 2k dots (k≧1) in said horizontal direction, said vertically-shifted image-forming means forming a primary upward-shifted image data item by shifting said developed image data item by said n dots in an upward direction, and a primary downward-shifted image data item by shifting said developed image data item by said n dots in a downward direction, said horizontally-shifted image-forming means forming a primary rightward-shifted image data item by shifting said developed image data item by said n dots in a rightward direction, and a primary-leftward-shifted image data item by shifting said developed image data item by said n dots in a leftward direction, said shifted image-forming means including second shifted image-forming means for forming Mu items ($0 \leq Mu \leq n-1$) of n−1 items of secondary upward-shifted image data to be formed by shifting said developed image data item by 1, 2, . . . n−1 dots, respectively, in said upward direction, Md items ($0 \leq Md \leq n-1$) of n−1 items of secondary downward-shifted image data to be formed by shifting said developed image data item by 1, 2, . . .n−1 dots, respectively, in said downward direction, Jr items ($0 \leq Jr \leq k-1$) of k−1 items of secondary rightward-shifted image data to be formed by shifting said developed image data item by 1, 2, . . .k−1 dots, respectively, in said rightward direction, and Jl items ($0 \leq Jl \leq k-1$) of k−1 items of secondary leftward-shifted image data to be formed by shifting said developed image data item by 1, 2, . . .k−1 dots in said leftward direction, in a manner such that said group of image pixels is made continuous between said developed image data item and said primary upward-shifted image data, between said developed image data item and said primary downward-shifted image data item, between said developed image data item and said primary rightward-shifted image data item, and between said developed image data item and said primary-leftward-shifted image data item, said diagonally-shifted image-forming means forming Gru items ($0 \leq Gru \leq k$) of k items of rightward/upward-shifted image data corresponding to respective rightward shifts of Ir dots ($k \geq Ir \geq 1$) by shifting said developed image data item by respective combinations of said Ir ($k \geq Ir \geq 1$) dots in said rightward direction and any of Ar, Ar+1, Ar+2, . . . and n dots (Ar is equal to an integer which is the largest of integers smaller than n×(1−Ir/k)) in said upward direction, Grd items ($0 \leq Grd \leq k$) of k items of rightward/downward-shifted image data corresponding to said respective leftward shifts of Il dots ($k \geq Il \geq 1$) by shifting said developed image data item by respective combinations of said Ir ($k \geq Ir \geq 1$) dots in said rightward direction and any of said Ar, Ar+1, Ar+2, . . . and n dots in said downward direction, Glu items ($0 \leq Glu \leq k$) of k items of leftward/upward-shifted image data corresponding to respective rightward shifts of Ir dots ($k \geq Ir \geq 1$) by shifting said developed image data item by respective combinations of said Il ($Il \geq 1$) dots in said leftward direction and any of said Al, Al+1, Al+2, . . . and n dots, in said upward direction, and Gld items ($0 \leq Gld \leq k$) of k items of leftward/downward-shifted image data corresponding to respective leftward shifts of Il dots ($Il \geq 1$) by shifting said developed image data item by said respective combinations of said Il dots ($k \geq Il \geq 1$) in said leftward direction and any of said Al, Al+1, Al+2, . . . and n dots in said downward direction, said print image-forming means forming said print image data by causing said developed image data item, said primary upward-shifted image data item, said Mu items of said secondary upward-shifted image data, said primary downward-shifted image data item, said Md items of said secondary downward-shifted image data, said primary rightward-shifted image data item, said Jr items of said secondary rightward-shifted image data, said primary-leftward-shifted image data item, said Jl items of said secondary leftward-shifted image data, said Gru items of said rightward/upward-shifted image data, said Grd items of said rightward/downward-shifted image data, said Glu items of said leftward/upward-shifted image data, and said Gld items of said leftward/downward-shifted image data, to be superposed, one upon another.

23. A print image-forming device according to claim 14, wherein said developed image-forming means forms said developed image data item by developing said basic image data into a dot matrix which is smaller in size than said dot matrix of said print image data in both of a vertical direction and a horizontal direction, said shifted image-forming means including:
  first shifted image data-forming means for forming a first shifted image data item by shifting said developed image data item by units of dots in one of said vertical direction and said horizontal direction,
  temporary developed image-forming means for forming a temporary developed image data item by causing said developed image data item and said first shifted image data, to be superposed, one upon another, in a manner such that said group of said image pixels overrides background pixels, and
  second shifted image-forming means for forming a second shifted image data by shifting said temporary developed image data item by units of dots in the other of said vertical direction and said horizontal direction, said print image-forming means forming said print image data by causing said temporary shifted image data item and said second shifted image data item to be superposed, one upon another, in a manner such that said group of image pixels overrides said background pixels.

24. A print image-forming device according to claim 23, wherein said developed image-forming means forms said developed image data item by developing said basic image data into a dot matrix which is smaller in size than said dot matrix of said print image data by n dots ($n \geq 1$) in said vertical direction and by k dots ($k \geq 1$) in said horizontal direction, said first shifted image-forming means forming one of a primary vertically-shifted image data item to be formed by shifting said developed image data item by said n dots in said vertical direction and a primary horizontally-shifted image data item to be formed by shifting said developed image data item by said k dots in said horizontal direction, as said first shifted image data item, forming m items ($0 \leq m \leq n-1$) of n−1 items of secondary vertically-shifted image data to be formed by shifting said developed image data item by 1, 2, . . .n−1 dots, respectively, in said vertical direction, in a manner such that said group of image pixels is made continuous between said developed image data item and said primary vertically-shifted image data item, when said primary vertically-shifted image data item is formed as said first shifted image data item, and forming j items ($0 \leq j \leq k-1$) of k−1 items of secondary horizontally-shifted image data to be formed by shifting said developed image data item by 1, 2, . . .k−1 dots, respectively, in said horizontal direction, in a manner such that said group of image pixels is made continuous between said developed image data item and said primary horizontally-shifted image data item, when said primary horizontally-shifted image data item is formed as said first shifted image data item, said temporary developed image-forming means forming said temporary developed image data item by causing said developed image data item, said primary vertically-shifted image data item, and said m items of said secondary vertically-shifted image data, to be superposed, one upon another, when said first shifted image data item is said primary vertically-shifted image data item, and causing said developed image data item, said primary horizontally-shifted image data item, and said j items of said secondary horizontally-shifted image data, to be superposed, one upon another, when said first shifted image data is said primary horizontally-shifted image data, said second shifted image-forming means forming a primary horizontally-shifted image data item by shifting the temporary developed image data item by k dots in said horizontal direction as said second shifted image data, and j items ($0 \leq j \leq k-1$) of k−1 items of secondary horizontally-shifted image data to be formed by shifting said developed image data item by 1, 2, ...k−1 dots, respectively, in said horizontal direction, in a manner such that said group of image pixels is made continuous between said temporary developed image data item and said primary horizontally-shifted image data item, when said primary vertically-shifted image data item is formed as said first shifted image data item, and forming a primary vertically-shifted image data item by shifting said temporary developed image data item by said n dots in said vertical direction, as said second shifted image data item, and m items ($0 \leq m \leq n-1$) of n−1 items of secondary vertically-shifted image data to be formed by shifting said developed image data item by 1, 2, ...n−1 dots, respectively, in said vertical direction, in a manner such that said group of image pixels is made continuous between said temporary developed image data item and said primary vertically-shifted image data item, when said primary horizontally-shifted image data is formed as said first shifted image data item, said print image-forming means forming said print image data by causing said temporary developed image data item, said primary horizontally-shifted image data item, and said j items of said secondary horizontally-shifted image data, to be superposed, one upon another, when said primary horizontally-shifted image data item is formed as said second shifted image data item, and causing said primary developed image data item, said primary vertically-shifted image data item, and said m items of said secondary vertically-shifted image data, to be superposed, one upon another, when said primary vertically-shifted image data item is formed as said second shifted image data item.

25. A print image-forming device according to claim 14, wherein said group of image pixels is increased in width in at least one of a vertical and a horizontal direction upon superposing said developed image data item and said at least one shifted image data item.

26. A print image-forming device according to claim 25, wherein said basic image defines a character size, and the character size does not change upon superposing said developed image data item and said at least one shifted image data item to form said print image data.

* * * * *